(12) United States Patent
Uchiyama et al.

(10) Patent No.: US 11,470,584 B2
(45) Date of Patent: Oct. 11, 2022

(54) COMMUNICATION DEVICE

(71) Applicant: Sony Corporation, Tokyo (JP)

(72) Inventors: Hiromasa Uchiyama, Tokyo (JP); Naoki Kusashima, Tokyo (JP); Hiroki Matsuda, Tokyo (JP); Yifu Tang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/264,885

(22) PCT Filed: Jul. 9, 2019

(86) PCT No.: PCT/JP2019/027229
§ 371 (c)(1),
(2) Date: Feb. 1, 2021

(87) PCT Pub. No.: WO2020/031592
PCT Pub. Date: Feb. 13, 2020

(65) Prior Publication Data
US 2021/0314930 A1 Oct. 7, 2021

(30) Foreign Application Priority Data
Aug. 8, 2018 (JP) .............................. JP2018-149399

(51) Int. Cl.
*H04W 72/04* (2009.01)
*H04W 4/40* (2018.01)
*H04W 12/08* (2021.01)

(52) U.S. Cl.
CPC ......... *H04W 72/0406* (2013.01); *H04W 4/40* (2018.02); *H04W 12/08* (2013.01)

(58) Field of Classification Search
CPC ............ H04W 4/40; H04W 4/44; H04W 4/46
See application file for complete search history.

(56) References Cited

U.S. PATENT DOCUMENTS

2016/0066337 A1* 3/2016 Sartori ............. H04W 72/0406
370/329
2018/0070264 A1 3/2018 Saiwai
(Continued)

FOREIGN PATENT DOCUMENTS

EP 3101973 A1 12/2016
JP 2017-208796 A 11/2017
(Continued)

OTHER PUBLICATIONS

International Search Report and Written Opinion dated Sep. 3, 2019, received for PCT Application PCT/JP2019/027229, Filed on Jul. 9, 2019, 7 pages including English Translation.
(Continued)

*Primary Examiner* — Kevin Kim
(74) *Attorney, Agent, or Firm* — Xsensus LLP

(57) ABSTRACT

It is possible to accommodate various communication traffics in a more suitable manner in inter-device communication such as V2X communication. A communication device (100) includes: a communication unit (220) that performs wireless communication; an acquisition unit (243) that acquires information regarding a control resource set from another device, the control resource set including one or more control resources allocated to a partial area included in a control area and defined for every purpose of resources allocated to a data area; and a control unit (241) that extracts the control resource set according to the acquired information regarding the control resource set and controls inter-device communication with another communication device via the wireless communication on the basis of the control resource set.

24 Claims, 27 Drawing Sheets

(56) References Cited

U.S. PATENT DOCUMENTS

| | | |
|---|---|---|
| 2018/0183551 A1 | 6/2018 | Chou |
| 2019/0059115 A1 | 2/2019 | Uchiyama et al. |
| 2019/0132832 A1 | 5/2019 | Uchiyama et al. |
| 2019/0159218 A1* | 5/2019 | Seo .................. H04W 24/08 |
| 2021/0306828 A1* | 9/2021 | Panteleev ............ H04W 72/02 |
| 2022/0039080 A1* | 2/2022 | Khoryaev ............. H04W 4/40 |

FOREIGN PATENT DOCUMENTS

| | | |
|---|---|---|
| KR | 20180081464 A | 7/2018 |
| WO | 2017/169111 A1 | 10/2017 |

OTHER PUBLICATIONS

AT&T, "Evaluation Scenarios for NR V2X", 3GPP TSG RAN WG1 Meeting #93, R1-1806984, May 21-25, 2018, 4 pages.

* cited by examiner

COMMUNICATION DEVICE

CROSS-REFERENCE TO RELATED APPLICATIONS

The present application is based on PCT filing PCT/JP2019/027229, filed Jul. 9, 2019, which claims priority to JP 2018-149399, filed on Aug. 8, 2018, the entire contents of each are incorporated herein by reference.

TECHNICAL FIELD

The present disclosure relates to a communication device.

BACKGROUND ART

In order to realize future autonomous driving, an expectation for in-vehicle communication (V2X communication) has increased in recent years. The V2X communication is an abbreviation for Vehicle to X communication, and is a system in which "something" performs communication with a vehicle. Examples of "something" here include a vehicle, an infrastructure, a network, and a pedestrian, and the like (V2V, V2I, V2N, and V2P). For example, Patent Document 1 discloses an example of a technology related to V2X communication.

Furthermore, as wireless communication for a vehicle, 802.11p-based dedicated short range communication (DSRC) has been mainly developed, but in recent years, standardization of "long term evolution (LTE)-based V2X", which is LTE-based in-vehicle communication, has been performed. In the LTE-based V2X communication, an exchange of a basic safety message and the like is supported. Furthermore, in recent years, new radio (NR) V2X communication using a 5G technology (NR) has been studied.

CITATION LIST

Patent Document

Patent Document 1: Japanese Patent Application Laid-Open No. 2017-208796

SUMMARY OF THE INVENTION

Problems to be Solved by the Invention

In conventional V2V communication, broadcast communication has been mainly performed, such that it has been possible for all terminal devices to decode an area of a control channel. On the other hand, in the NR-V2X communication, it becomes possible to use unicast communication or multicast communication, in addition to the broadcast communication. Therefore, in the NR-V2X communication, it is desired to introduce a new control channel capable of efficiently accommodating the various communication traffics as described above.

Therefore, the present disclosure proposes a technology capable of accommodating various communication traffics in a more suitable manner in inter-device communication such as V2X communication.

Solutions to Problems

According to the present disclosure, there is provided a communication device including: a communication unit that performs wireless communication; an acquisition unit that acquires information regarding a control resource set from another device, the control resource set including one or more control resources allocated to a partial area included in a control area and defined for every purpose of resources allocated to a data area; and a control unit that extracts the control resource set according to the acquired information regarding the control resource set and controls inter-device communication with another communication device via the wireless communication on the basis of the control resource set.

Furthermore, according to the present disclosure, there is provided a communication device including: a communication unit that performs wireless communication; a notification unit that notifies a terminal device of information regarding a control resource set, the control resource set including one or more control resources allocated to a partial area included in a control area and defined for every purpose of resources allocated to a data area; and a control unit that associates one or more resources allocated to be available for inter-device communication and included in the data area with the control resource set according to purposes of the resources.

Effects of the Invention

As described above, according to the present disclosure, a technology capable of accommodating various communication traffics in a more suitable manner in inter-device communication such as V2X communication is provided.

Note that the effect described above is not necessarily restrictive, and any effect set forth in the present specification or other effects that can be grasped from the present specification may be accomplished together with or instead of the effect described above.

MODE FOR CARRYING OUT THE INVENTION

Figure 1:
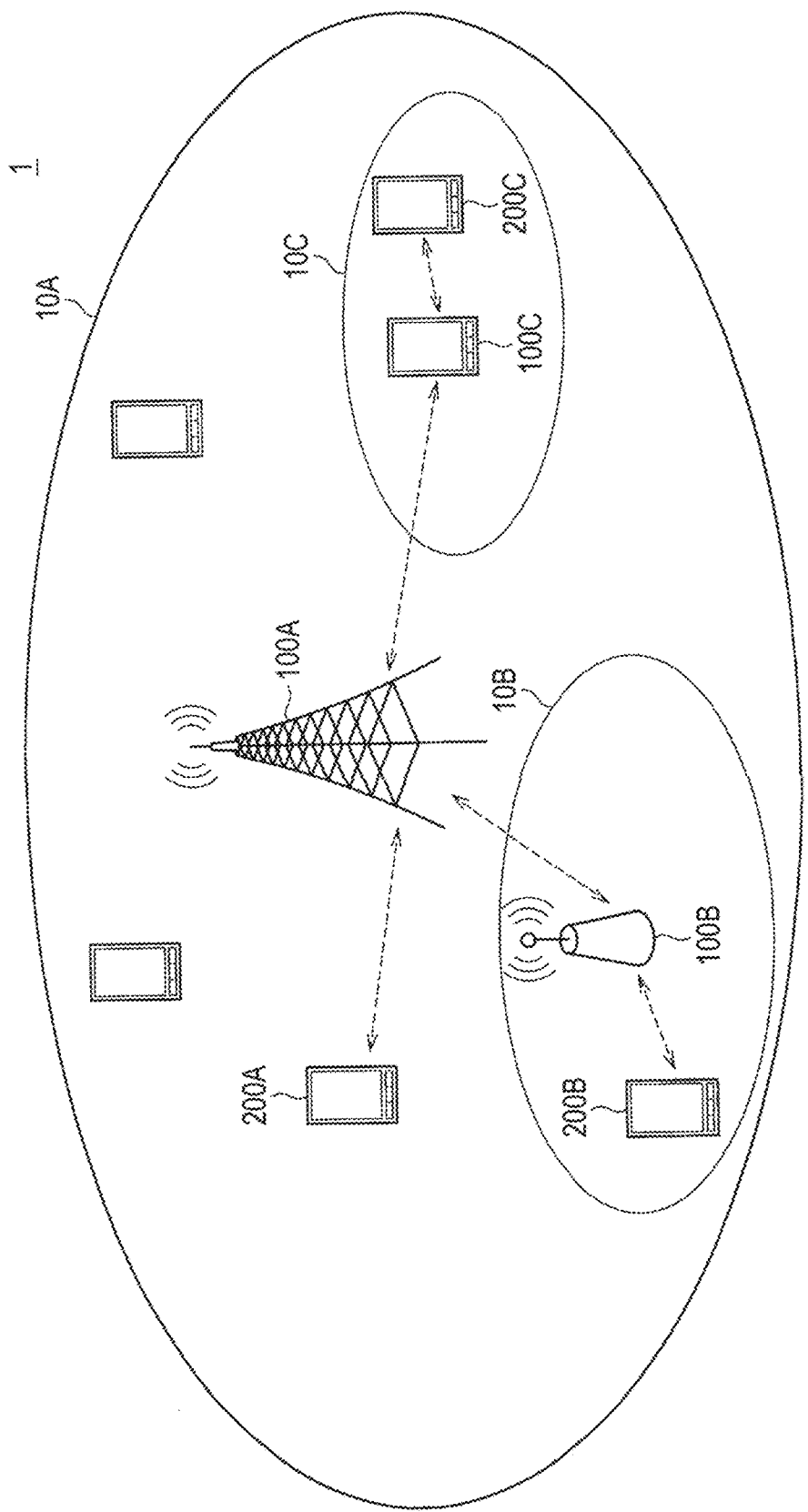
FIG. 1 is an explanatory diagram for describing an example of a schematic configuration of a system according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will be omitted.

Note that a description will be given in the following order.

1. Configuration example
1.1. Example of system configuration
1.2. Configuration example of base station
1.3. Configuration example of terminal device
2. V2X communication
3. Mode of allocating resources to sidelink
4. CORESET
5. Study on resource allocation in V2X communication
6. Technical feature
6.1. Definition of type of control channel
6.2. Determination of area of control channel
6.3. Securing of resource in area of control channel
7. Application example
7.1. Application example related to base station
7.2. Application example related to terminal device
8. End 1. Configuration Example <1.1. Example of System Configuration>

First, an example of a schematic configuration of a system 1 according to an embodiment of the present disclosure will be described with reference to FIG. 1. FIG. 1 is an explanatory diagram for describing an example of a schematic configuration of a system 1 according to an embodiment of the present disclosure. As illustrated in FIG. 1, the system 1 includes a wireless communication device 100 and a terminal device 200. Here, the terminal device 200 is also called a user. The user can also be called a user equipment (UE). A wireless communication device 100C is also called a UE-Relay. The UE here may be a UE defined in long term evolution (LTE) or LTE-Advanced (LTE-A), and the UE-Relay may be a prose UE to network relay discussed in $3^{rd}$ generation partnership project (3GPP) and may more generally mean a communication device.

(1) Wireless Communication Device 100

The wireless communication device 100 is a device that provides a wireless communication service to subordinate devices. For example, a wireless communication device 100A is a base station of a cellular system (or a mobile communication system). The base station 100A performs wireless communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station by, for example, an X2 interface, and can transmit and receive control information and the like to and from another base station. Furthermore, the base station 100A is logically connected to a so-called core network (not illustrated) by, for example, an S1 interface, and can transmit and receive control information and the like to and from the core network. Note that communication between these devices can be physically relayed by various devices.

Here, the wireless communication device 100A illustrated in FIG. 1 is a macro cell base station, and the cell 10A is a macro cell. On the other hand, wireless communication devices 100B and 100C are master devices that operate small cells 10B and 10C, respectively. As an example, the master device 100B is a small cell base station that is fixedly installed. The small cell base station 100B establishes a wireless backhaul link with the macro cell base station 100A and an access link with one or more terminal devices (for example, a terminal device 200B) in the small cell 10B. Note that the wireless communication device 100B may be a relay node defined in 3GPP. The master device 100C is a dynamic access point (AP). The dynamic AP 100C is a mobile device that dynamically operates the small cell 10C. The dynamic AP 100C establishes a wireless backhaul link with the macro cell base station 100A and an access link with one or more terminal devices (for example, a terminal device 200C) in the small cell 10C. The dynamic AP 100C may be, for example, a terminal device mounted with hardware or software that can operate as a base station or a wireless access point. The small cell 10C in this case is a dynamically formed local network (localized network/virtual cell).

The cell 10A may be operated according to any wireless communication mode such as, for example, LTE, LTE-A, LTE-Advanced Pro, global system for mobile communications (GSM) (registered trademark), universal mobile telecommunication system (UMTS), wideband code division multiple access (W-CDMA), CDMA2000, world interoperability for microwave access (WiMAX), WiMAX2, IEEE 802.16, or the like.

Note that the small cell is a concept that can include various types of cells (for example, a femto cell, a nano cell, a pico cell, a micro cell, and the like) that are arranged to overlap or not to overlap the macro cell and are smaller than the macro cell. In a certain example, the small cell is operated by a dedicated base station. In another example, the small cell is operated by causing a terminal that becomes a master device to temporarily operate as a small cell base station. A so-called relay node can also be considered as a form of a small cell base station. A wireless communication device that functions as a master station of the relay node is also referred to as a donor base station. The donor base station may mean a DeNB in the LTE, and more generally, may mean a master station of the relay node.

(2) Terminal Device 200

The terminal device 200 can perform communication in the cellular system (or the mobile communication system). The terminal device 200 performs wireless communication with the wireless communication device (for example, the base station 100A or the master device 100B or 100C) of the cellular system. For example, the terminal device 200A receives a downlink signal from the base station 100A and transmits an uplink signal to the base station 100A.

Furthermore, the terminal device 200 is not limited to only a so-called UE, and may be, for example, a so-called low cost UE such as a machine type communication (MTC) terminal, an enhanced MTC (eMTC) terminal, and a narrow band-Internet of things (NB-IoT) terminal, and the like. Furthermore, the terminal device 200 may be an infrastructure terminal such as a road side unit (RSU) or a terminal such as a customer premises equipment (CPE).

(3) Supplement

The schematic configuration of the system 1 has been described hereinabove, but the present technology is not limited to the example illustrated in FIG. 1. For example, a configuration that does not include the master devices, a small cell enhancement (SCE), a heterogeneous network (HetNet), an MTC network, and the like, can be adopted as the configuration of the system 1. Furthermore, as another example of the configuration of the system 1, the master device may be connected to the small cell to construct a cell under the small cell.

<1.2. Configuration Example of Base Station>

Figure 2:
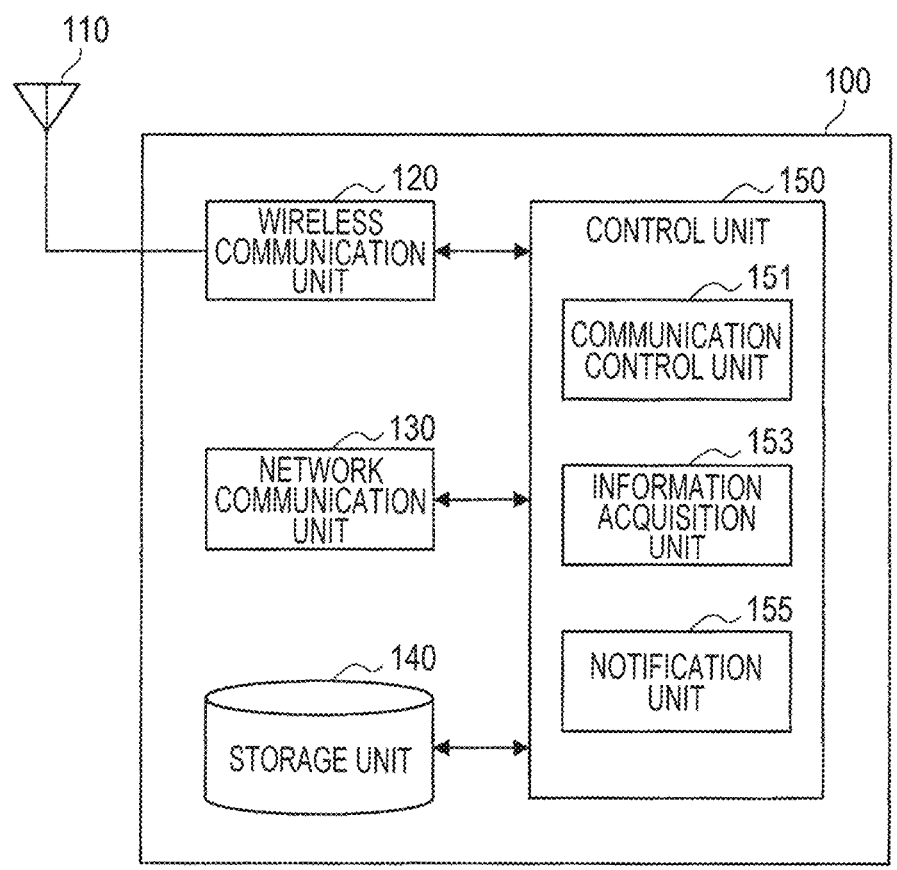
FIG. 2 is a block diagram illustrating an example of a configuration of a base station according to the embodiment.

Next, a configuration of the base station 100 according to the embodiment of the present disclosure will be described with reference to FIG. 2. FIG. 2 is a block diagram illustrating an example of a configuration of the base station 100 according to the embodiment of the present disclosure. Referring to FIG. 2, the base station 100 includes an antenna unit 110, a wireless communication unit 120, a network communication unit 130, a storage unit 140, and a control unit 150.

(1) Antenna Unit 110

The antenna unit 110 radiates a signal output from the wireless communication unit 120 into a space as a radio wave. Furthermore, the antenna unit 110 converts a radio wave in the space into a signal and outputs the signal to the wireless communication unit 120.

(2) Wireless Communication Unit 120

The wireless communication unit 120 transmits and receives a signal. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, another node described above includes another base station and a core network node.

Note that, as described above, in the system 1 according to the present embodiment, the terminal device may operate as a relay terminal to relay communication between a remote terminal and the base station. In such a case, for example, the wireless communication device 100C corresponding to the relay terminal may not include the network communication unit 130.

(4) Storage Unit 140

The storage unit 140 temporarily or permanently stores a program for operating the base station 100 and various data.

(5) Control Unit 150

The control unit 150 provides various functions of the base station 100. The control unit 150 includes a communication control unit 151, an information acquisition unit 153, and a notification unit 155. Note that the control unit 150 can further include other components other than these components. In other words, the control unit 150 can also perform operations other than operations of these components.

The communication control unit 151 executes various processes related to the control of wireless communication with the terminal device 200 via the wireless communication unit 120. For example, the communication control unit 151 may control allocation of resources for the terminal device 200 to perform wireless communication with another device (for example, the base station 100 or another terminal device 200). As a specific example, the communication control unit 151 may control allocation of resources for the terminal device 200 to perform inter-device communication (for example, sidelink communication) with another terminal device 200. Furthermore, the communication control unit 151 executes various processing related to the control of communication with another node (for example, another base station, a core network node or the like) via the network communication unit 130.

The information acquisition unit 153 acquires various information from the terminal device 200 or another node. The acquired information may be used, for example, for controlling wireless communication with the terminal device, controlling cooperation with another node, and the like.

The notification unit 155 notifies the terminal device 200 or another node of various information. As a specific example, the notification unit 155 may notify a terminal device 200 in a cell of various information for the terminal device 200 to perform wireless communication with the base station 100. Furthermore, as another example, the notification unit 155 may notify another node (for example, another base station) of the information acquired from the terminal device in the cell. Furthermore, the notification unit 155 may notify the terminal device 200 in the cell of information for the terminal device 200 to perform inter-terminal communication (for example, sidelink communication) with another terminal device 200.

<1.3. Configuration Example of Terminal Device>

Figure 3:
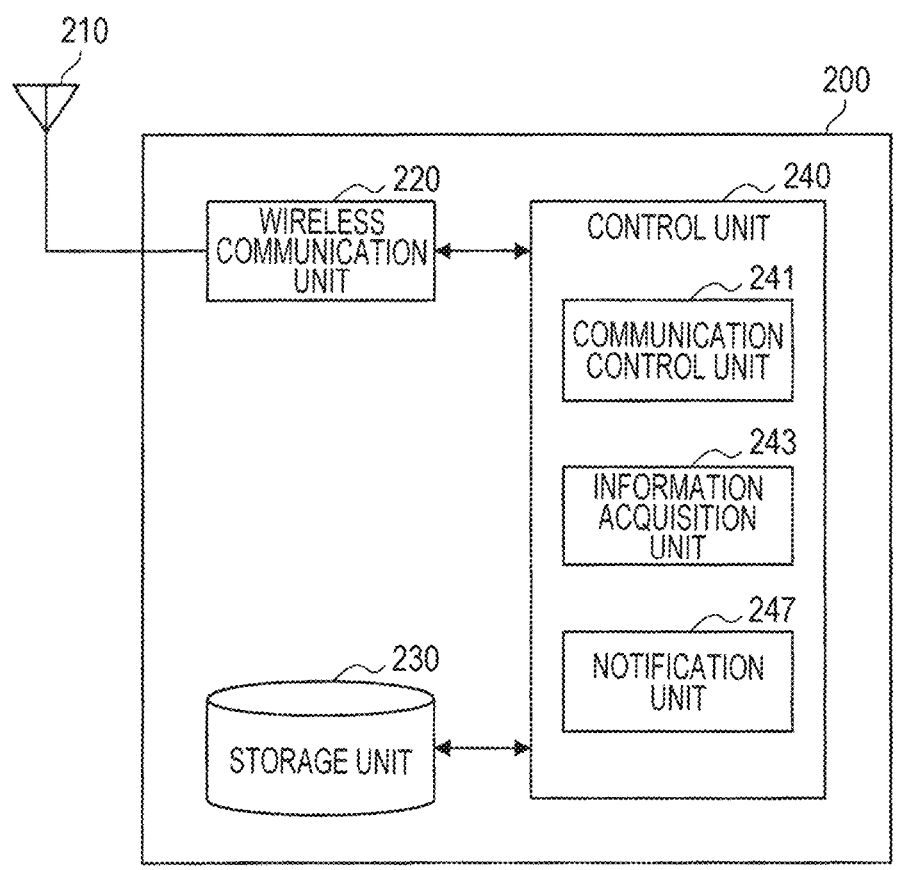
FIG. 3 is a block diagram illustrating an example of a configuration of a terminal device according to the embodiment.

Next, an example of a configuration of the terminal device 200 according to the embodiment of the present disclosure will be described with reference to FIG. 3. FIG. 3 is a block diagram illustrating an example of a configuration of the terminal device 200 according to the embodiment of the present disclosure. As illustrated in FIG. 3, the terminal device 200 includes an antenna unit 210, a wireless communication unit 220, a storage unit 230, and a control unit 240.

(1) Antenna Unit 210

The antenna unit 210 radiates a signal output from the wireless communication unit 220 into a space as a radio wave. Furthermore, the antenna unit 210 converts a radio wave in the space into a signal and outputs the signal to the wireless communication unit 220.

(2) Wireless Communication Unit 220

The wireless communication unit 220 transmits and receives a signal. For example, the wireless communication unit 220 receives a downlink signal from the base station and transmits an uplink signal to the base station.

Furthermore, in the system 1 according to the present embodiment, the terminal device 200 may directly communicate with another terminal device 200 without the intervention of the base station 100. In this case, the wireless communication unit 220 may transmit and receive a sidelink signal to and from another terminal device 200.

(3) Storage Unit 230

The storage unit 230 temporarily or permanently stores a program for operating the terminal device 200 and various data.

(4) Control Unit 240

The control unit 240 provides various functions of the terminal device 200. For example, the control unit 240 includes a communication control unit 241, an information acquisition unit 243, and a notification unit 247. Note that the control unit 240 can further include other components other than these components. In other words, the control unit 240 can also perform operations other than operations of these components.

The communication control unit 241 executes various processing related to the control of wireless communication with the base station 100 or another terminal device 200 via the wireless communication unit 220. For example, the communication control unit 241 may execute various processing related to control of inter-device communication (for example, sidelink communication) with another terminal device 200. As a specific example, the communication control unit 241 may execute various processing related to selection of resources for transmitting a packet to another terminal device 200.

The information acquisition unit 243 acquires various information from base station 100 or another terminal device 200. As a specific example, the information acquisition unit 243 may acquire information regarding communication with another terminal device 200 from the base station 100 or another terminal device 200. As a more specific example, the information acquisition unit 243 may acquire information regarding inter-terminal communication by a desired traffic type from the base station 100 or another terminal device 200.

The notification unit 247 notifies the base station 100 and another terminal device 200 of various information. As a specific example, the notification unit 247 may notify another terminal device 200 of information regarding resources reserved to be used for transmission of the packet.

2. V2X Communication

Figure 4:
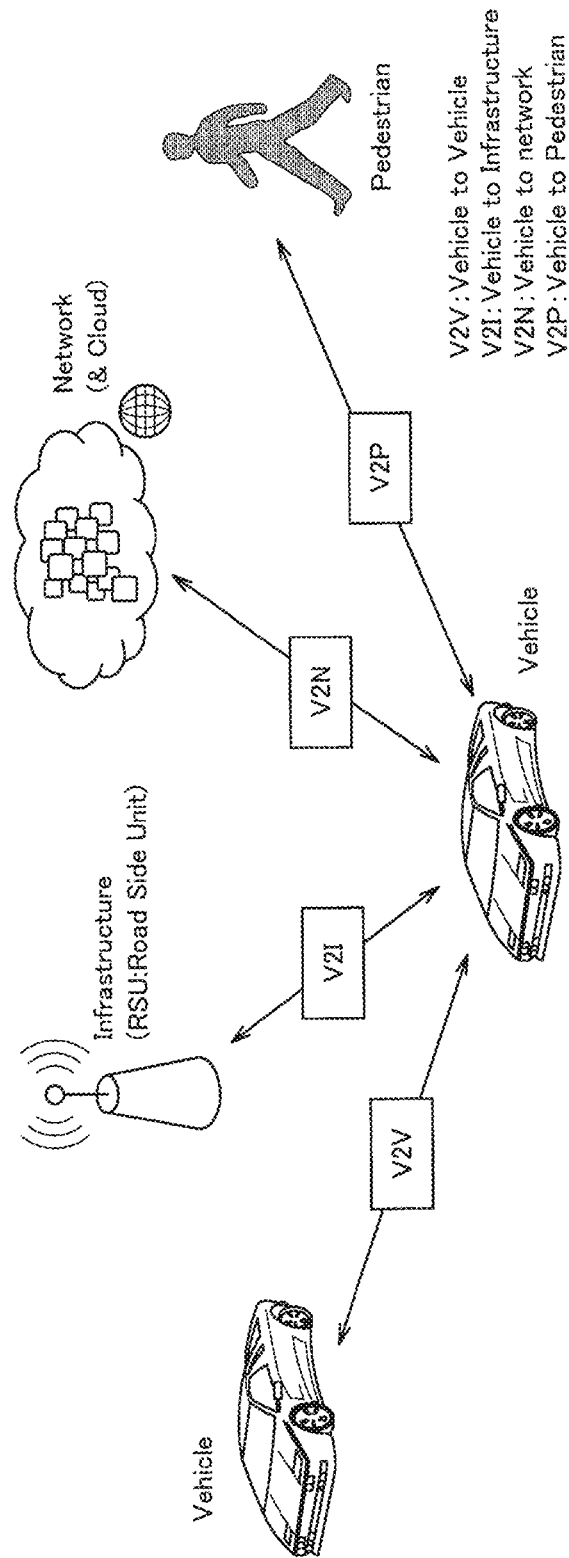
FIG. 4 is a diagram illustrating an outline of V2X communication.

Next, an outline of V2X communication will be described. The V2X communication is an abbreviation for Vehicle to X communication, and is a system in which "something" performs communication with a vehicle. For example, FIG. 4 is a diagram illustrating an outline of V2X communication. Examples of "something" here include a vehicle, an infrastructure, a network, a pedestrian, and the like (V2V, V2I, V2N, and V2P), for example, as illustrated in FIG. 4.

(Overview of V2X Communication)

Figure 5:
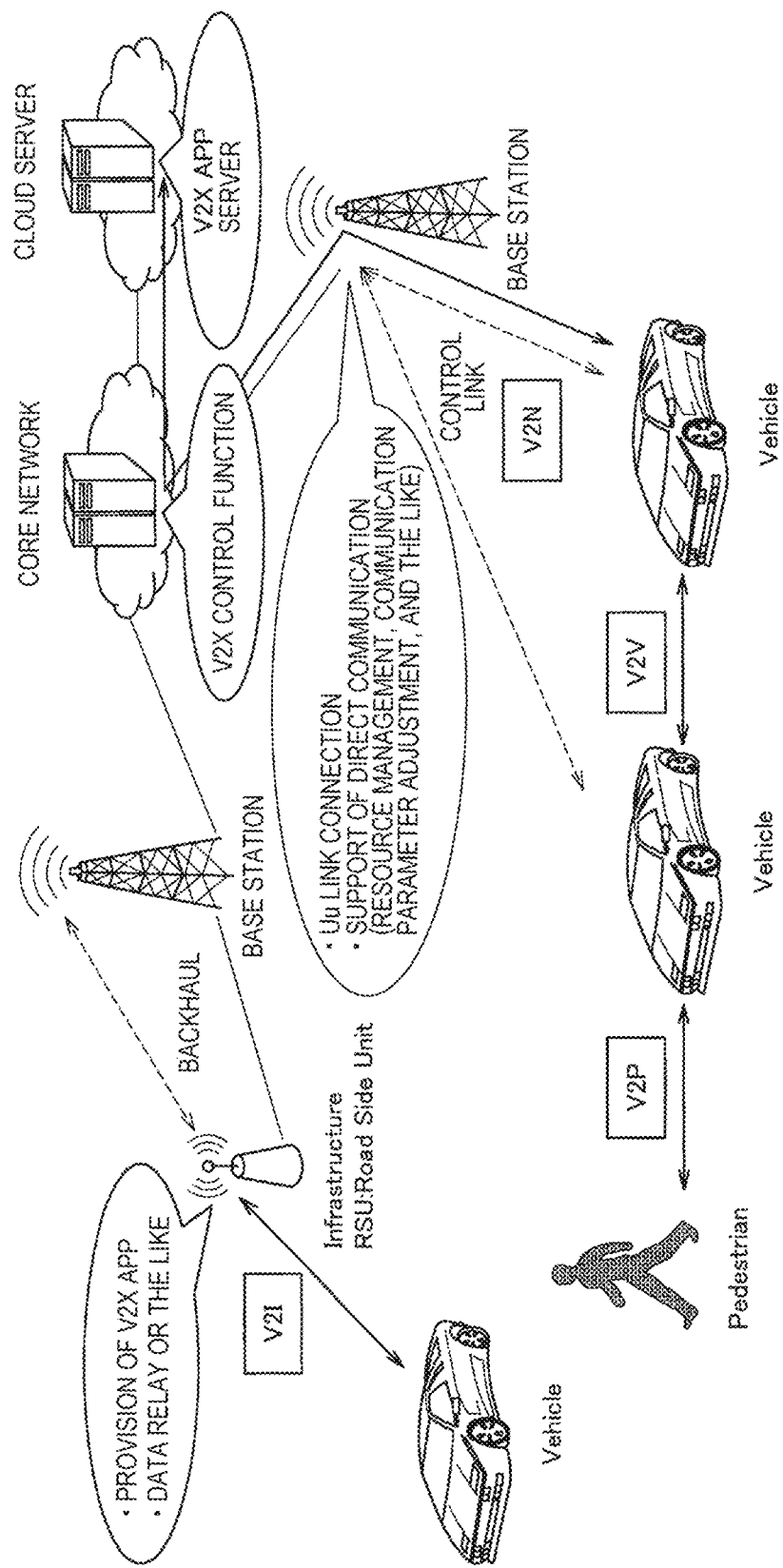
FIG. 5 is an explanatory diagram for describing an example of an overview of the V2X communication.

Furthermore, FIG. 5 is an explanatory diagram for describing an example of an overview of the V2X communication. In the example illustrated in FIG. 5, a V2X application server (APP server) is held as a cloud server, and control of V2X communication on a core network side is performed by the V2X application server. The base station performs Uu-link communication with the terminal device, and performs communication control of direct communication such as V2V communication, V2P communication or the like. Furthermore, in addition to the base station, a road side unit (RSU) is arranged as an infrastructure of a road side. Two RSUs, that is, a base station-type RSU and a UE-type RSU are conceivable. In the RSU, a V2X application (V2X APP) is provided or data relay or the like is supported.

(Use Case of V2X Communication)

Figure 6:
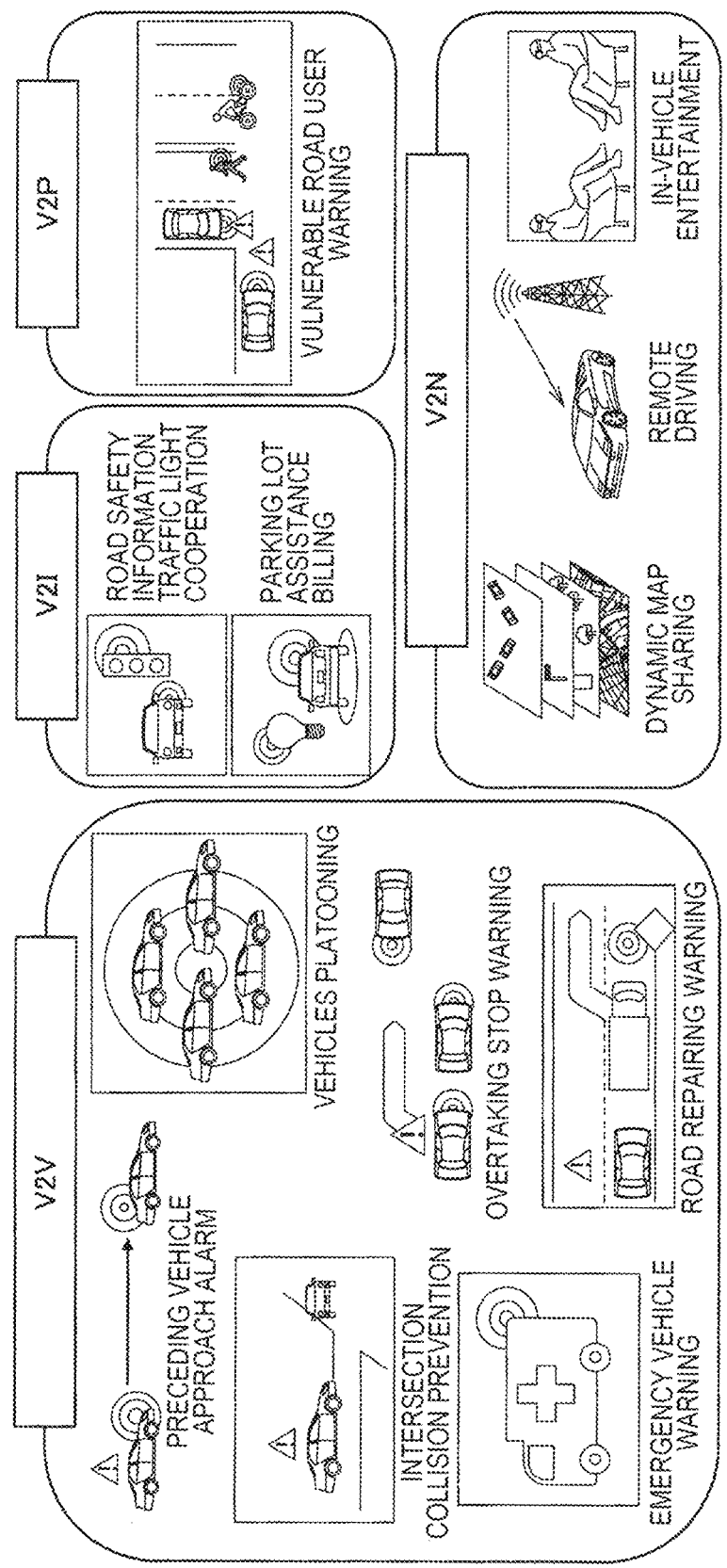
FIG. 6 is a diagram illustrating an example of a use case of the V2X communication.

As wireless communication for a vehicle, 802.11p-based dedicated short range communication (DSRC) has been mainly developed till now, but in recent years, standardization of "LTE-based V2X (LTE-based V2X communication)", which is LTE-based in-vehicle communication, has been performed. In the LTE-based V2X communication, an exchange of a basic safety message and the like is supported. Meanwhile, with the aim of further improving the V2X communication, new radio (NR) V2X communication using a 5G technology (NR) has been studied in recent years. For example, FIG. 6 is a diagram illustrating an example of a use case of the V2X communication.

In the NR V2X communication, new use cases that require a high reliability, a low delay, high speed communication, and a high capacity that were difficult to support with the LTE-based V2X till now are supported. Specific examples of these use cases include provision of a dynamic map, remote driving, or the like among examples illustrated in FIG. 6. Furthermore, in addition to this, specific examples of these use cases include sensor data sharing in which sensor data is exchanged between vehicles or between a road and a vehicle or a platooning use case for vehicles platooning. Such use cases and requirements for V2X communications are defined in 3GPP TR 22.886. For reference, an outline of an example of use cases will be described below.

(1) Vehicles Platoonning

This is a use case of vehicles platooning in which a plurality of vehicles becomes a platoon and travel in the same direction, and information for controlling the vehicles platooning is exchanged between a vehicle leading the vehicles platooning and another vehicle. By exchanging these information, for example, it becomes possible to further reduce an inter-vehicle distance of the vehicles platooning.

(2) Extended Sensors

This is a use case in which sensor-related information (raw data before data processing or data after processing) can be exchanged between vehicles, or the like. The sensor information is collected through local sensors, live video images (for example, live video images between a vehicle and surrounding vehicles, RSUs, and pedestrians), V2X application servers, and the like. By exchanging these information, it becomes possible for the vehicle to obtain information that cannot be obtained from its own sensor information and it becomes possible for the vehicle to perceive/recognize a wider range of environments. Note that in the present use case, since it is necessary to exchange a lot of information, a high data rate is required for communication.

(3) Advanced Driving

This is a use case that enables semi-automatic driving and fully automatic driving. In the present use case, the RSU shares perception/recognition information obtained from its own sensor and the like with the surrounding vehicle, such that each vehicle can adjust a track or an operation in synchronization and cooperation with another vehicle. Furthermore, each vehicle can share an intention or an intent of driving with the surrounding vehicle.

(4) Remote Driving

This is a use case that causes a remote operator or a V2X application to perform a remote operation. Remote control is used in a case where another person does the driving instead of a person who has difficulty in doing the driving, a case of operating a vehicle in a dangerous area, or the like. For example, a cloud computing-based operation can be applied to public transportation where routes or roads along which the vehicle is to travel are determined to some extent. In the present use case, a high reliability and a low transmission delay are required for communication.

(Physical Layer Enhancement)

Further enhancement of a physical layer from LTE V2X is required in order to achieve the requirements described above. A target link includes a Uu link or a PC5 link (sidelink). The Uu link is a link between an infrastructure such as a base station, a road side unit (RSU), or the like and a terminal device. Furthermore, the PC5 link (sidelink) is a link between terminal devices. Main points of the enhancement are shown below.

Examples of the enhancement include:
Channel format
Sidelink feedback communication
Sidelink resource allocation mode
Vehicle position information estimation technology
Inter-terminal relay communication
Support of unicast communication and multicast communication
Multi-carrier communication and carrier aggregation
Multiple-input multiple-output (MIMO)/beamforming
High frequency support (for example: 6 GHz or higher) . . . and the like.

Furthermore, examples of the channel format include flexible numerology, a short transmission time interval (TTI), multi-antenna support, a waveform, and the like. Furthermore, examples of the sidelink feedback communication include a hybrid automatic repeat request (HARQ), channel status information (CSI), and the like.

(V2X Operation Scenario)

Hereinafter, an example of a V2X communication operation scenario will be described. In V2N communication, only DL/UL communication between a base station and a terminal device was performed, which was simple. On the other hand, in V2V communication, various communication paths are considered. Each scenario will hereinafter be described, mainly focusing on an example of the V2V communication, but a similar communication operation can also be applied to V2P or V2I. Note that in the V2P or the V2I, a communication destination is a pedestrian or an RSU.

Figure 7:
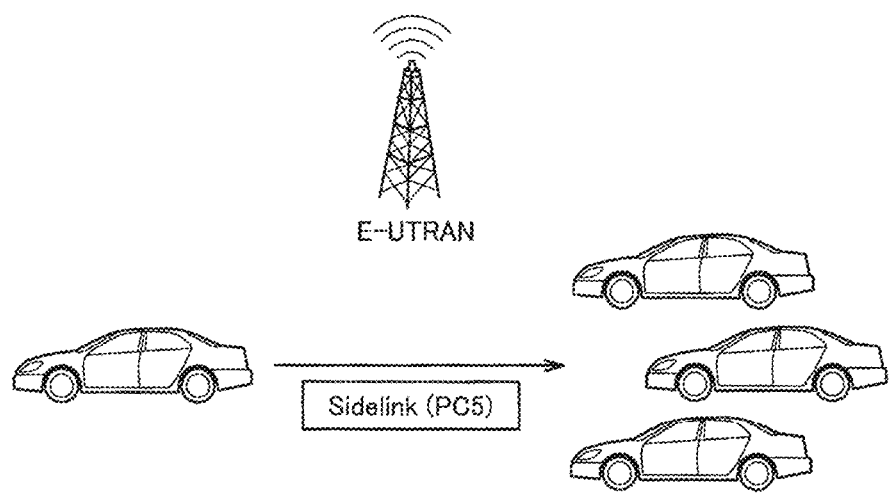
FIG. 7 is an explanatory diagram for describing an example of a V2X operation scenario.
Figure 8:
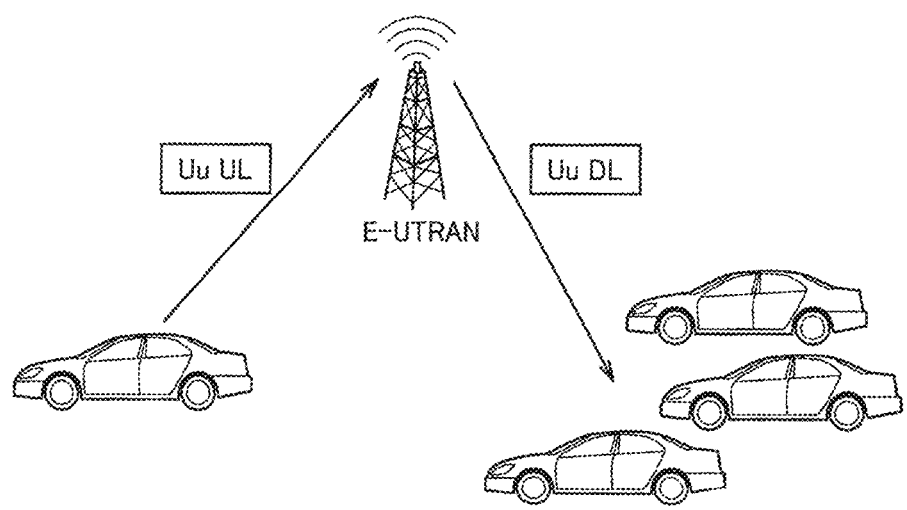
FIG. 8 is an explanatory diagram for describing an example of a V2X operation scenario.
Figure 9:
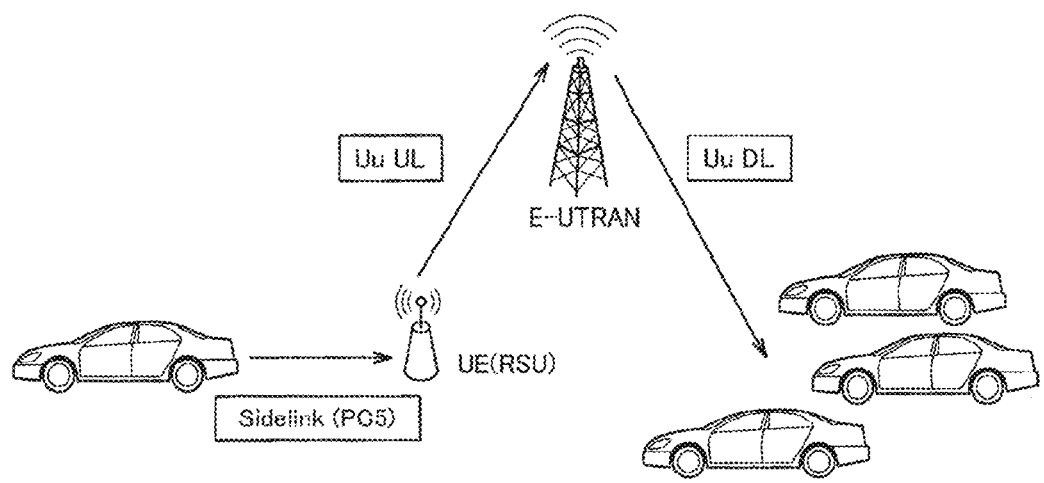
FIG. 9 is an explanatory diagram for describing an example of a V2X operation scenario.
Figure 10:
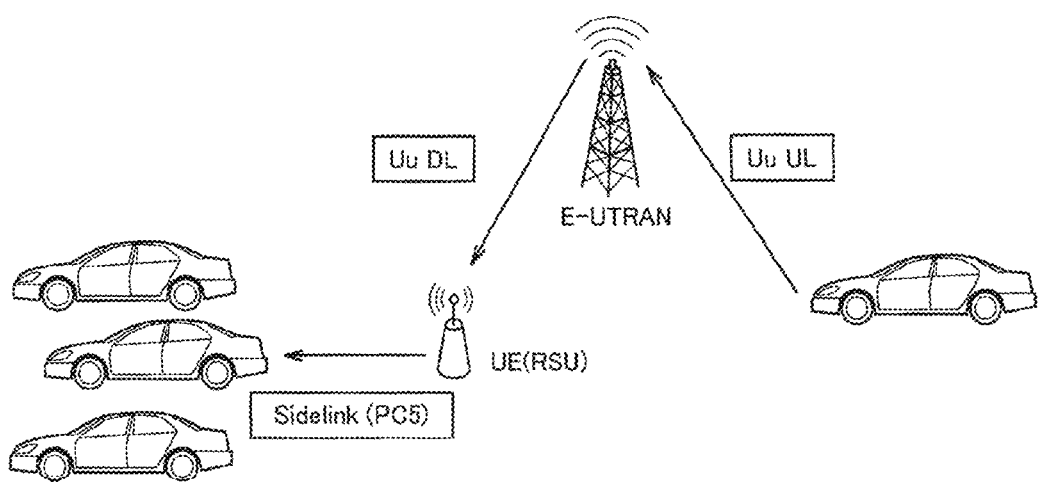
FIG. 10 is an explanatory diagram for describing an example of a V2X operation scenario.
Figure 11:
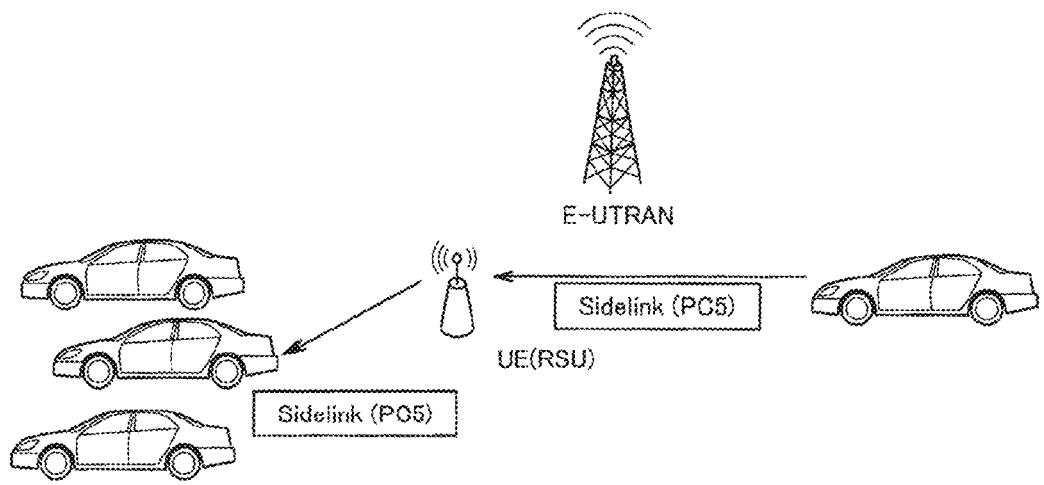
FIG. 11 is an explanatory diagram for describing an example of a V2X operation scenario.
Figure 12:
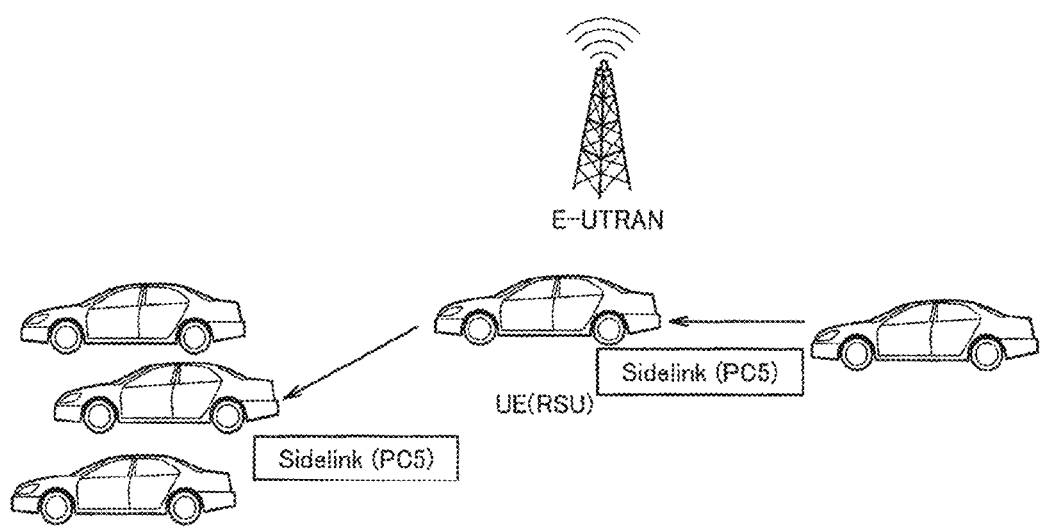
FIG. 12 is an explanatory diagram for describing an example of a V2X operation scenario.

For example, FIGS. 7 to 12 are explanatory diagrams for describing examples of V2X operation scenarios. Specifically, FIG. 7 illustrates a scenario in which vehicles communicate directly with each other without the intervention of a base station (evolved universal mobile telecommunication system (UMTS) terrestrial radio access network (E-UTRAN)). FIG. 8 illustrates a scenario in which vehicles communicate with each other via a base station. FIGS. 9 and 10 illustrate scenarios in which vehicles communicate with each other via a terminal device (UE, here RSU) and a base station. FIGS. 11 and 12 illustrate scenarios in which vehicles communicate with each other via a terminal device (UE, here RSU or another vehicle).

Note that in FIGS. 7 to 12, a "sidelink" corresponds to a communication link between terminal devices and is also referred to as PC5. Specific examples of the sidelink include communication links of V2V, V2P, and V2I. A "Uu interface" corresponds to a wireless interface between a terminal device and a base station. A specific example of the Uu interface includes a communication link of V2N. A "PC5 interface" corresponds to a wireless interface between terminal devices.

3. Mode of Allocating Resources to Sidelink

Next, an outline of a mode of allocating resources to the sidelink will be described. As the mode of allocating the resources to the sidelink, there are a "Mode3 resource allocation" mode in which the base station allocates the resources of the sidelink and a "Mode4 resource allocation" mode in which the terminal device itself performs sensing and performs resource selection of the sidelink. Here, a description will be provided, mainly focusing on the Mode4 resource allocation mode.

Resource Pool Allocation

In performing the Mode4 resource allocation, allocation of a resource pool is performed in advance. The allocation of the resource pool is performed by, for example, the base station. Furthermore, as another example, the allocation of the resource pool may be performed by preconfiguration. The terminal device senses resources for sidelink communication from the allocated resource pool, selects an appropriate resource by itself, and performs communication.

Figure 13:
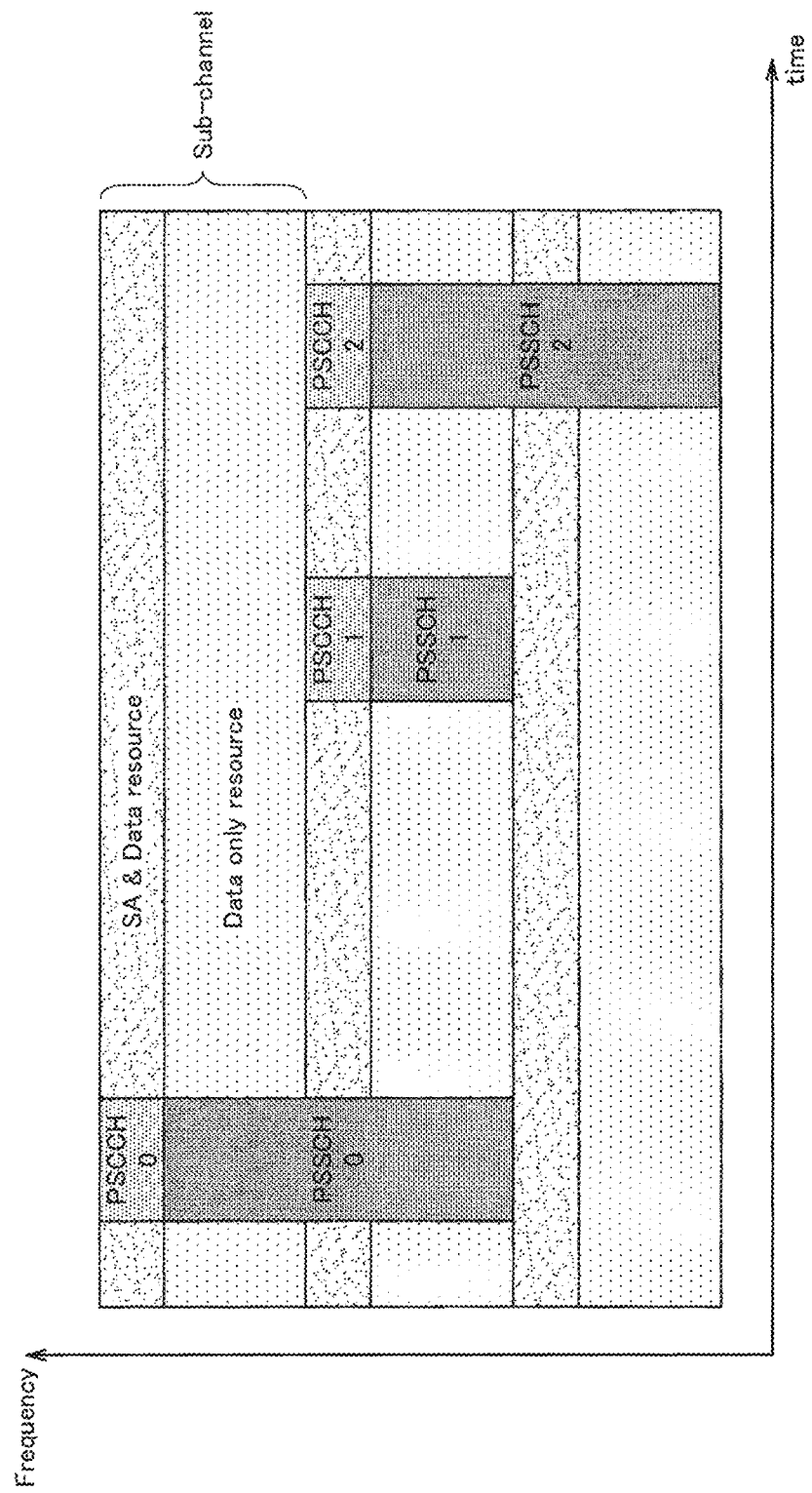
FIG. 13 is a diagram illustrating an example of a configuration of resources allocated to sidelink communication.

For example, FIG. 13 is a diagram illustrating an example of a configuration of resources (resource pool) allocated to sidelink communication, and illustrates an example of a case where frequency division multiplexing (FDM) is applied. As illustrated in FIG. 13, the resource pool is divided into a scheduling assignment (SA) area and a Data area, and a physical sidelink control channel (PSCCH) and a physical sidelink shared channel (PSSCH) are transmitted by each area. Note that a description will hereinafter be provided, focusing on a case where the FDM is applied as illustrated in FIG. 13, but an application destination of the technology according to the present disclosure is not necessarily limited. As a specific example, also in a case where time division multiplexing (TDM) is applied, it is possible to apply a technology according to the present disclosure described below as long as there is no technical discrepancy. Note that in a case where the TDM is applied, the SA area and the Data area are orthogonal to each other on a time axis. Furthermore, in a case where the TDM is applied, in parts described in relation to a frequency direction and a time direction in the FDM, the frequency direction and the time direction may be appropriately replaced with each other.

Mode4 Resource Allocation

Figure 14:
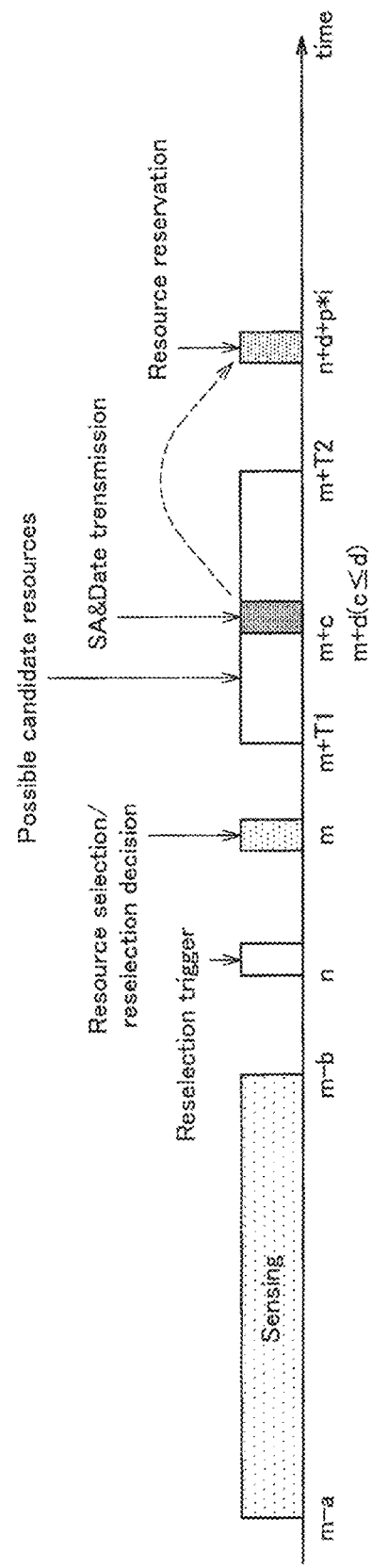
FIG. 14 is an explanatory diagram for describing an example of an operation timeline in a case where the terminal device transmits a packet on the basis of Mode4 resource allocation.

An outline of a Mode4 resource allocation will be described with reference to FIG. 14. FIG. 14 is an explanatory diagram for describing an example of an operation timeline in a case where the terminal device transmits a packet on the basis of Mode4 resource allocation. As illustrated in FIG. 14, the terminal device that transmits a packet first performs sensing in order to discover a resource used for transmission of the packet from the resource pool. Next, the terminal device selects the resource from the resource pool on the basis of a result of the sensing. Then, the terminal device transmits the packet using the selected resource. Furthermore, at this time, the terminal device performs reservation of a resource to be used for subsequent packet transmission, if necessary.

Figure 15:
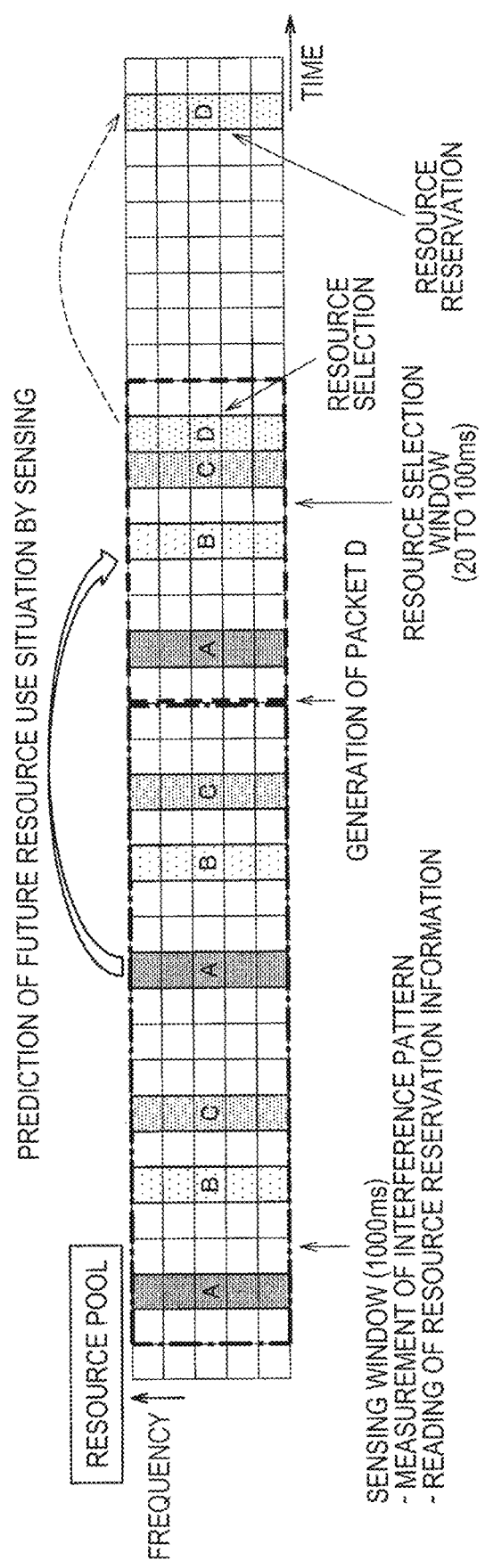
FIG. 15 is an explanatory diagram for describing an example of a sensing operation for selecting a resource from a resource pool.

Here, an example of the sensing operation described above will be described with reference to FIG. 15. FIG. 15 is an explanatory diagram for describing an example of the sensing operation for selecting the resource from the resource pool.

Specifically, the terminal device performs selection of a resource or reservation of a future resource in a resource selection window on the basis of a measurement result of an interference pattern in a sensing window or a resource reservation situation in the sensing window. As a specific example, in the example illustrated in FIG. 15, in a case where a packet D, which is a target to be transmitted, is generated, the terminal device predicts a future resource use situation, for example, resources to be used for transmission of the other packets A to C in the future on the basis of the result of the sensing. The terminal device can select or reserve a resource available for transmission of the packet D, that is, a resource that is predicted not to be used for transmission of the other packets by using a result of the prediction.

4. CORESET

Next, an outline of a CORESET will be described. The control resource set (CORESET) includes a plurality of resource blocks. The CORESET is equivalent to a control area in an LTE subframe. In LTE, a frequency direction of a control information area is defined for the entire system band, and it was thus unnecessary to set parameters in a frequency domain. On the other hand, in the CORESET, it is possible to set parameters not only in a time domain but also in a frequency domain, and notification and setting of these parameters to the terminal device are performed using radio resource control (RRC) signaling.

<<5. Study on Resource Allocation in V2X Communication>

The present disclosure focuses particularly on a resource allocation mode of a V2V communication link in NR V2X communication. In inter-terminal communication (that is, inter-device communication) in the NR V2X communication, various communication such as unicast communication, multicast communication, or the like as well as broadcast communication is performed. Furthermore, in the inter-terminal communication in the NR V2X communication, various modes in which allocation methods of resources are different from each other, such as allocation of transmission resources by the base station (for example, Mode3 resource allocation), selection of resources by the terminal device (for example, Mode4 resource allocation), or the like, are also similarly supported. As such, improvement of an area of a control channel is desired in order to realize various types of communication in the inter-terminal communication in the NR V2X communication. Therefore, in the present disclosure, setting of the area of the control channel in the NR V2X communication and a method of selecting a resource in the area are proposed below. Note that in the following description, for convenience, the area of the control channel of an area to which resources are allocated (for example, an area in a frequency direction and a time direction) is also referred to as a "control area" and an area of a resource used for transmission of data, of the area to which the resources are allocated is also referred to as a "data area".

In conventional V2V communication, broadcast communication has been mainly performed, such that it has been possible for all terminal devices to decode an area of a control channel (control area). On the other hand, in the NR V2X communication, it becomes possible to use unicast communication, multicast communication, or the like, in addition to the broadcast communication, as described above. Against this background, it is desired to introduce a new control channel capable of efficiently accommodating various communication traffics in realizing the NR V2X communication.

In view of the situation as described above, the present disclosure proposes a technology capable of accommodating various communication traffics such as broadcast, multicast, unicast, and the like, in a more suitable manner in inter-device communication such as V2X communication.

6. Technical Feature

Next, a description will be provided, focusing on a technology capable of accommodating various communication traffics in a more preferable manner particularly in inter-device communication such as sidelink communication or the like in NR V2X communication, as a technical feature of the system according to the embodiment of the present disclosure. Specifically, each of the following approaches will be described as an example of the technology capable of efficiently accommodating various communication traffics in inter-device communication such as sidelink communication or the like.

Definition of type of control channel
Determination of area of control channel
Securing of resource in area of control channel Note that in the following description, an example of a case where the technology according to the present disclosure is applied to sidelink communication will be described focusing on sidelink communication as an example of inter-device communication.

<6.1. Definition of Type of Control Channel>

First, a technical feature of the system according to the present embodiment will be described from the viewpoint of definition of a type of control channel. Specifically, a CORESET in the sidelink is newly defined.

Since the broadcast, the unicast, and the multicast are supported in the sidelink communication in realizing the NR V2X communication, as described above, a CORSET corresponding to each traffic type is only required to be defined. Specifically, the CORESET is defined as an area in which control information is sent.

Furthermore, a resource allocation mode in the sidelink includes a Mode3 resource allocation mode in which communication resources of the sidelink are allocated from the base station and a Mode4 resource allocation mode in which the terminal device itself senses and selects transmission resources. Against this background, the CORESET may be defined for each of the resource allocation modes described above.

Therefore, the following CORESETs are newly introduced for the sidelink. Note that in the following description, the CORESETs introduced for the sidelink, such as CORESETs given as an example below, are also referred to as "sidelink CORESETs".

CORESET for each traffic type
UE common CORESET(Broadcast)
UE group specific CORESET(Multicast)
UE specific CORESET(Unicast)
CORESET for each resource allocation mode
Mode 3 CORESET
Mode 4 CORESET
CORESET for CORESET allocation notification
CORESET for ACK/NACK reply Note that a new CORESET may be defined by a combination of the CORESETs described above. As a specific example, in a case where a resource is a resource allocated by the base station and a traffic type is UE common, a new CORESET may be defined as "UE common-Mode 3 CORESET". Furthermore, as described above, a CORESET for notification of allocation of the CORESET may be specified. Furthermore, whether or not beamforming is used in a specific CORESET may be defined as attribute information.

As described above, in the system according to the embodiment of the present disclosure, the CORESETs are defined according to purposes of resources allocated to the data area, such as a difference in the traffic type, a difference in the resource allocation mode, or the like.

<6.2. Determination of Area of Control Channel>

Next, a technical feature of the system according to the present embodiment will be described from the viewpoint of determination of an area of a control channel. The area of the CORESET described above is set to a frequency band available for the sidelink communication. As a specific example, resource pools available for the sidelink communication are defined, and communication is performed in each resource pool. A control channel and a data channel are defined in the resource pool. Furthermore, sub-resource pools may be defined in at least some resource pools. In this case, a control channel and a data channel may be defined in the sub-resource pool.

Figure 16:
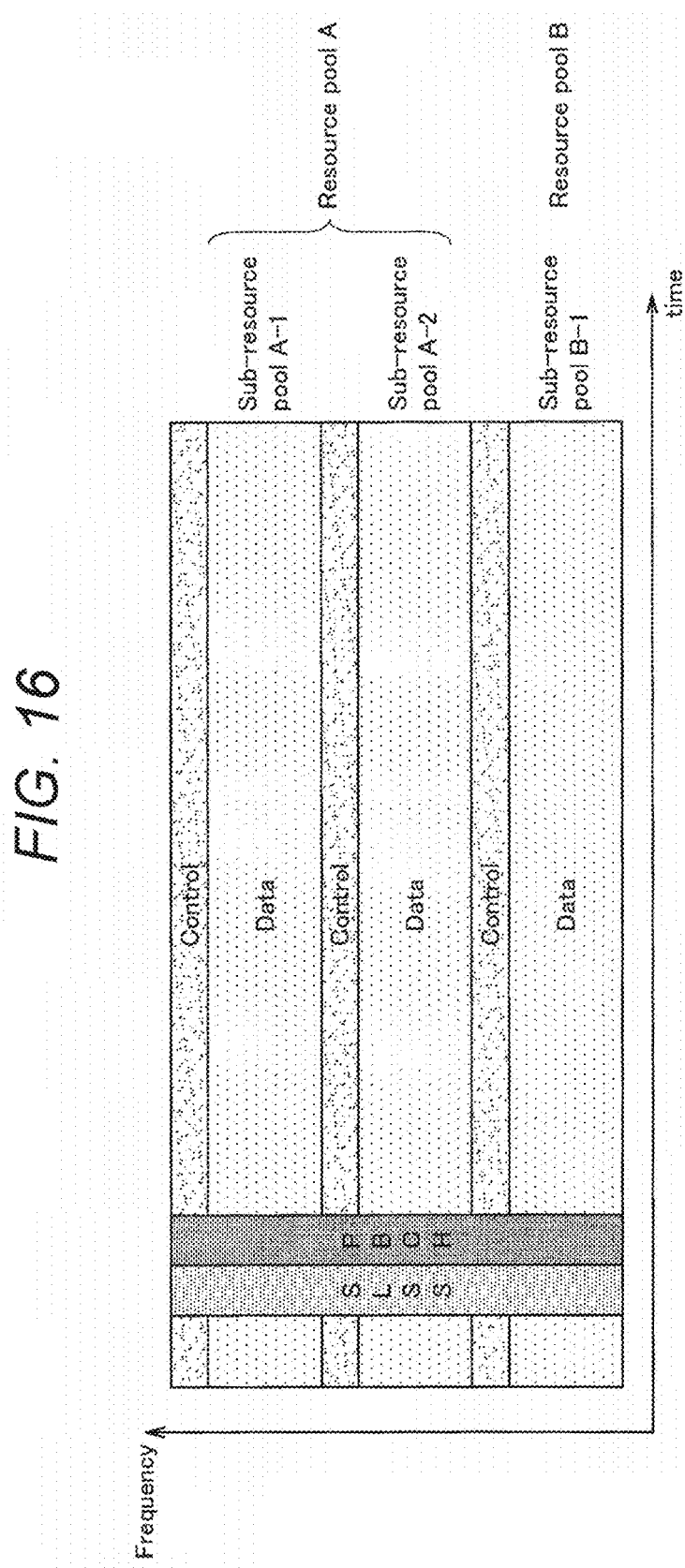
FIG. 16 is an explanatory diagram for describing an example of a resource configuration in the system according to the embodiment.

For example, FIG. 16 is an explanatory diagram for describing an example of a resource configuration in the system according to the embodiment of the present disclosure, and illustrates an example of a configuration of resources allocated to be available for sidelink communication. In FIG. 16, a horizontal axis represents a time, and a vertical axis represents a frequency. "SLSS" indicates a sidelink synchronization signal. "PBCH" indicates a physical sidelink broadcast channel. "Control" schematically indicates a control channel, and corresponds to, for example, a physical sidelink control channel (PSCCH). "Data" schematically indicates a data channel, and corresponds to, for example, a physical sidelink shared channel (PSSCH). Note that an area to which the control channel is allocated, of an area to which resources are allocated corresponds to an example of a "control area" and an area to which the data channel is allocated, of the area to which the resources are allocated corresponds to an example of a "data area".

In the example illustrated in FIG. 16, "Resource pool A" and "Resource pool B" are set as resource pools available for the sidelink communication. Furthermore, in the "Resource pool A", "Sub-resource pool A-1" and "Sub-resource pool A-2" are defined as sub-resource pools. Furthermore, in the "Resource pool B", "Sub-resource pool B-1" is defined as a sub-resource pool.

Furthermore, as illustrated in FIG. 16, in a frequency band available for sidelink communication, an area to which resources are allocated (for example, an area in a time direction and a frequency direction) is divided in the frequency direction, such that control areas to which control channels are allocated and data areas to which data channels are allocated are defined. With such a configuration, it becomes possible to refer to at least the control area even at any position in the time direction. In particular, in V2X communication, there is a case where a real time property is required. Even in such a case, as illustrated in FIG. 16, the control areas and the data areas are allocated, such that a delay can be suppressed to be smaller.

Figure 17:
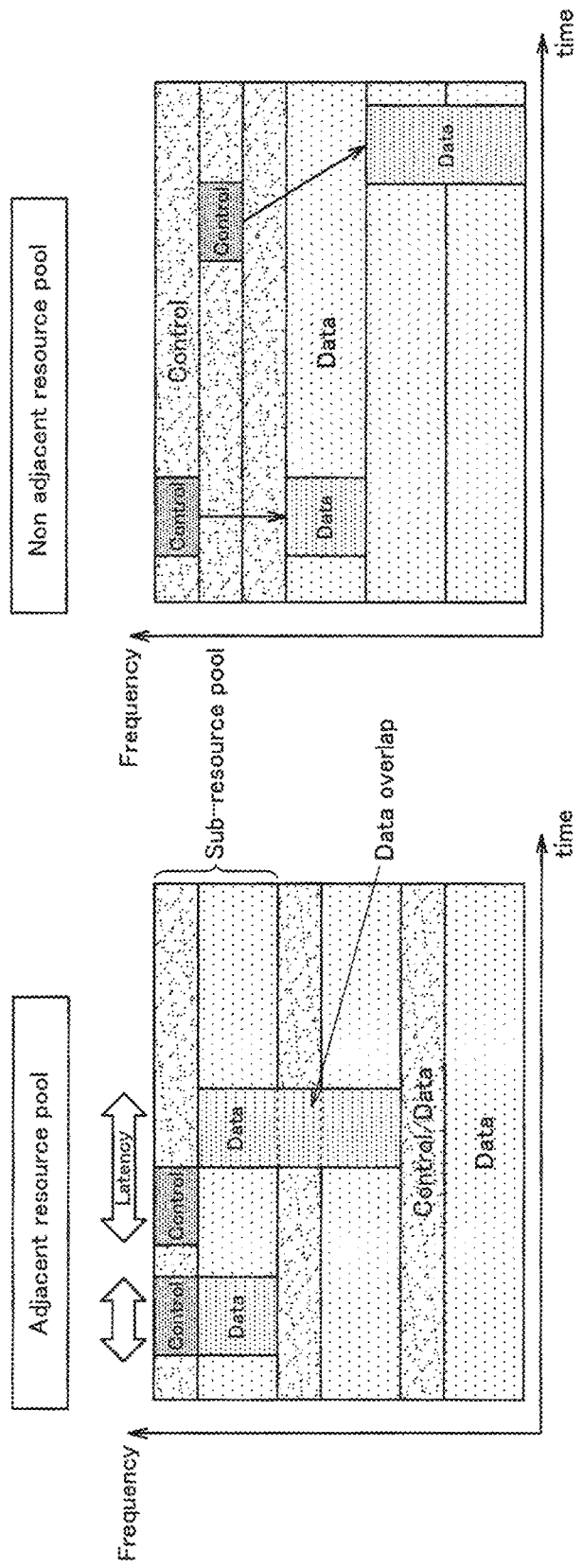
FIG. 17 is an explanatory diagram for describing an example of a setting method of a control resource set (CORESET) according to a configuration of a resource pool in the system according to the embodiment.

Furthermore, FIG. 17 is an explanatory diagram for describing an example of a setting method of a CORESET according to a configuration of a resource pool in the system according to the embodiment of the present disclosure. A horizontal axis and a vertical axis in the example illustrated in FIG. 17 indicate a time and a frequency, respectively, similarly to the example illustrated in FIG. 16. As illustrated in FIG. 17, examples of the configuration of the resource pool include an "Adjacent resource pool" and a "Non adjacent resource pool". Specifically, as illustrated in FIG. 17, in the "Adjacent resource pool", a control area Control and a data area Data are allocated so as to be adjacent to each other. Furthermore, in the "Non adjacent resource pool", each control area and each data area are aggregated, and a corresponding control area and data area are not necessarily allocated so as to be adjacent to each other. As illustrated in FIG. 17, the CORESET described above can be applied not only to the "Adjacent resource pool" but also to the "Non adjacent resource pool".

The various CORESETs described above are defined for at least some area (hereinafter, also referred to as a "partial area") of the control area described above. Note that at this time, the CORESETs may be fixedly allocated or may be quasi-statically allocated, to the partial area of the control area. Note that in the V2X communication, it may be desirable that the allocation of the resources is more flexibly controlled according to an environment. Therefore, it is more desirable that the CORESETs are quasi-statically allocated to the partial area of the control area. With such a configuration, for example, it becomes possible to change the allocation of the CORESETs to the partial area of the control area according to the environment, and it thus becomes possible to use the resources more flexibly and more efficiently.

Figure 18:
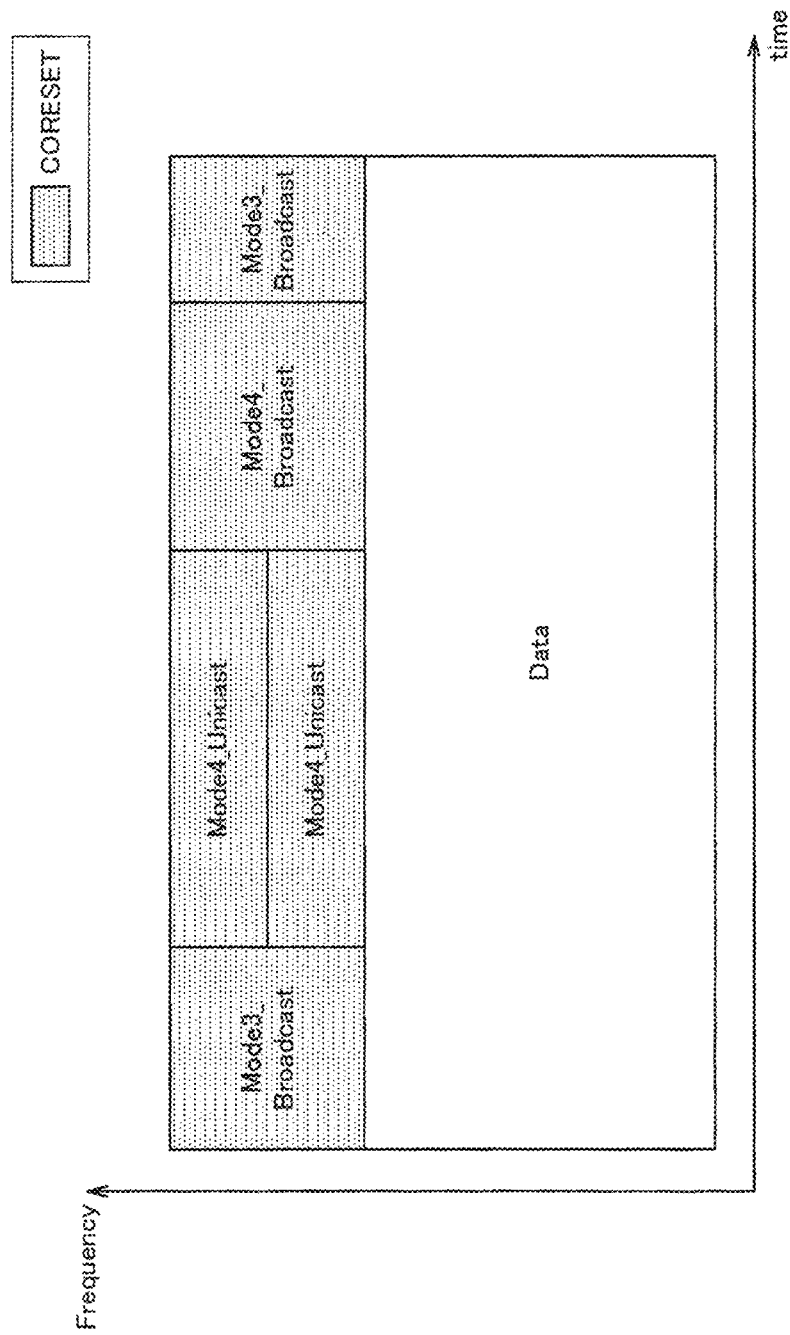
FIG. 18 is an explanatory diagram for describing an example of allocation of a sidelink CORESET.

For example, FIG. 18 is an explanatory diagram for describing an example of allocation of a sidelink CORESET. A horizontal axis and a vertical axis in the example illustrated in FIG. 18 indicate a time and a frequency, respectively, similarly to the example illustrated in FIG. 16. In the example illustrated in FIG. 18, similarly to the example illustrated in FIG. 16, in a frequency band available for sidelink communication, an area to which resources are allocated is divided in the frequency direction, such that a control area and a data area are defined. Furthermore, in the example illustrated in FIG. 18, CORESETs according to purposes of resources allocated to the data area (for example, CORESETs according to a difference in a traffic type or a difference in a resource allocation mode) is allocated to each partial area generated by dividing the control area at least in the time direction. More specifically, in the example illustrated in FIG. 18, CORESETs corresponding to each of Mode3_Broadcast, Mode4_Unicast, Mode4_Broadcast, and Mode3_Broadcast are allocated to each partial area.

The allocation of the sidelink CORESET is set in RRC by, for example, a device having authority regarding control of sidelink communication such as the base station 100 or the like. Examples of the device having the authority regarding the control of the sidelink communication include a base station, an RSU, a relay node, a relay terminal, a master terminal (reader terminal), and the like. Note that the device having the authority regarding the control of the sidelink communication described above corresponds to an example of a "first device". Furthermore, another device, which is a target of inter-device communication such as the sidelink communication or the like and different from the first device, such as a device corresponding to a terminal device 200 which does not have the authority described above, with respect to the first device, corresponds to an example of a "second device". Furthermore, for the terminal device 200 outside a network, it is only required to use a terminal preconfiguration or use a relay allocated from the base station 100.

Note that in a case where the relay is used for notification of information regarding the CORESET such as setting of the CORESET, or the like, RRC for the sidelink may be introduced. Specifically, the terminal device 200 (transmission terminal) within a communication range of the base station 100 may perform setting of the CORESET (for example, notification of information regarding the CORESET) for a terminal outside the communication range using the RRC of the sidelink. Notification of the RRC for the sidelink is provided from the terminal device 200 (transmission terminal) to another terminal device 200 (reception terminal) by using, for example, any one or both of a PBCH and a PSSCH.

In a case where the relay is used, the terminal device 200 may decide whether or not to relay the information regarding the CORESET (for example, information regarding allocation of control information). As a specific example, the terminal device 200 may relay the information regarding CORESET notification of which is provided from the base station 100 to another terminal device 200 on the basis of a reference signal received power (RSRP) level of a downlink signal from the base station 100. Furthermore, the terminal device 200 may decide whether or not to relay the information regarding the CORESET to another terminal device 200 different from a transmission terminal (communication terminal 200) on the basis of an RSRP of a sidelink signal from the terminal device 200 (hereinafter, also referred to as a "transmission terminal"), which is a transmission source of the information regarding the CORESET. Furthermore, the terminal device 200 may decide whether or not to relay the information regarding the CORESET to another terminal device 200 on the basis of a type of synchronization signal of the transmission terminal. Note that examples of the type of the synchronization signal include a type indicating either a synchronization signal relayed from the inside of a coverage or a synchronization signal relayed from the outside of the coverage, and the like.

Figure 19:
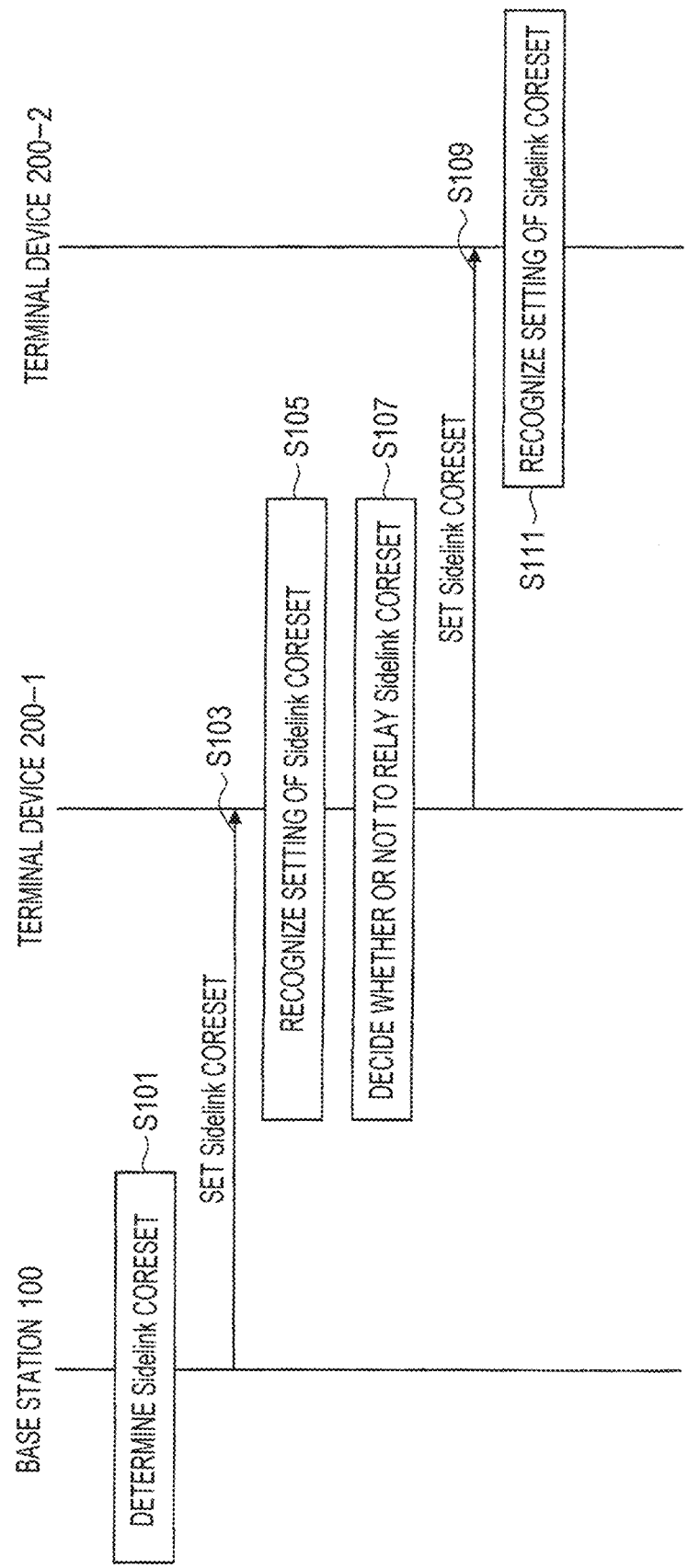
FIG. 19 is a sequence diagram illustrating an example of a flow of a series of processing of the system according to the embodiment.

Here, an example of a flow of processing in a case where the terminal device 200 relays information regarding a CORESET to another terminal device 200 will be described with reference to FIG. 19. FIG. 19 is a sequence diagram illustrating an example of a flow of a series of processing of the system according to the embodiment of the present disclosure. Specifically, FIG. 19 illustrates an example of a flow of processing in a case where a terminal device 200-1 relays information regarding a CORESET of which the base station 100 notifies the terminal device 200-1 to another terminal device 200-2.

Specifically, the base station 100 (communication control unit 151) first determines a type of CORESET to be applied as a sidelink CORESET (for example, a type of CORESET according to a type of traffic), and allocates a CORESET for every type to a control area in a band available for sidelink communication (S101). Then, the base station 100 (notification unit 155) sets the sidelink CORESET in addition to the terminal device 200-1, by notifying the terminal device 200-1 of information regarding the sidelink CORESET (S103).

The terminal device 200-1 (communication control unit 241) recognizes the setting of the sidelink CORESET (for example, the type of CORESET, the allocation of each CORESET, and the like) by extracting (for example, by decoding) the sidelink CORESET on the basis of the information notification of which is provided from the base station 100 (S105). Therefore, the terminal device 200-1 can control the sidelink communication according to a type of the sidelink communication used by the terminal device 200-1, according to a recognition result of the sidelink CORESET.

Furthermore, the terminal device 200-1 (communication control unit 241) decides whether or not to relay the information regarding the CORESET notification of which is provided from the base station 100 to another terminal device (for example, the terminal device 200-2) located within a communication range according to various conditions such as a communication environment and the like (S107). Then, the terminal device 200-1 (notification unit 247) sets a sidelink CORESET for another terminal device 200-2 located within the communication range by relaying the information regarding the CORESET notification of which is provided from the base station 100 to the terminal device 200-2 according to a result of the decision (3109). The terminal device 200-2 (communication control unit 241) recognizes the setting of the sidelink CORESET by extracting (for example, decoding) the sidelink CORESET on the basis of the information relayed by the terminal device 200-1 (S111).

Note that the information regarding the sidelink CORESET of which the base station 100 notifies the terminal device 200-1 or the information relayed to the terminal device 200-2 by the terminal device 200-1 corresponds to an example of "information regarding a control resource set".

Hereinabove, an example of a flow of processing in a case where the terminal device relays the information regarding the CORESET to another terminal device has been described with reference to FIG. 19.

Figure 20:
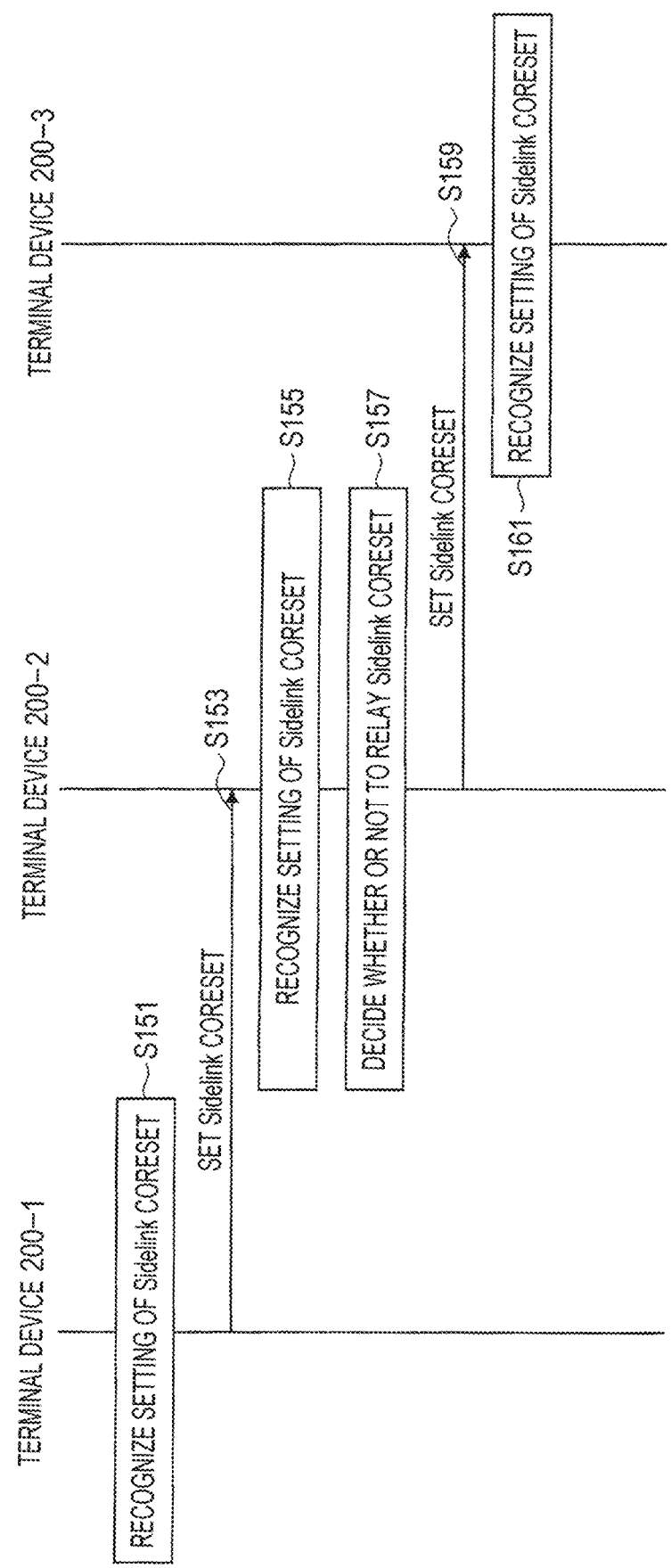
FIG. 20 is a sequence diagram illustrating another example of a flow of a series of processing of the system according to the embodiment.

Next, another example of a flow of processing in a case where the terminal device relays information regarding a CORESET to another terminal device will be described with reference to FIG. 20. FIG. 20 is a sequence diagram illustrating another example of a flow of a series of processing of the system according to the embodiment of the present disclosure. Specifically, FIG. 20 illustrates an example of a flow of processing in a case where the terminal device 200-2 further relays the information regarding the CORESET from the base station 100 relayed to the terminal device 200-2 by the terminal device 200-1 to another terminal device 200-3.

Specifically, in the example illustrated in FIG. 20, the terminal device 200-1 (communication control unit 241) recognizes setting of a sidelink CORESET by extracting (for example, decoding) the sidelink CORESET on the basis of information notification of which is provided from the base station 100 (S151). Then, the terminal device 200-1 (notification unit 247) sets a sidelink CORESET for another terminal device 200-2 located within a communication range by relaying the information to the terminal device 200-2 (S153). At this time, the terminal device 200-1 (communication control unit 241) may decide whether or not to relay the information regarding the CORESET notification of which is provided from the base station 100 to another terminal device located within the communication range, similarly to the example illustrated in FIG. 19.

The terminal device 200-2 (communication control unit 241) recognizes the setting of the sidelink CORESET by extracting (for example, decoding) the sidelink CORESET on the basis of the information notification of which is provided from the terminal device 200-1 (S155). Therefore, the terminal device 200-2 can control the sidelink communication according to a type of the sidelink communication used by the terminal device 200-2, according to a recognition result of the sidelink CORESET.

Furthermore, the terminal device 200-2 (communication control unit 241) decides whether or not to relay the information regarding the CORESET notification of which is provided from the terminal device 200-1 to another terminal device (for example, the terminal device 200-3) located within a communication range according to various conditions such as a communication environment and the like (S157). Then, the terminal device 200-2 (notification unit 247) sets a sidelink CORESET for another terminal device 200-3 located within the communication range by relaying the information regarding the CORESET notification of which is provided from the terminal device 200-1 to the terminal device 200-3 according to a result of the decision (S159). The terminal device 200-3 (communication control unit 241) recognizes the setting of the sidelink CORESET by extracting (for example, decoding) the sidelink CORESET on the basis of the information relayed by the terminal device 200-2 (S161).

As such, the information regarding the CORESET transmitted from the base station 100 may be relayed by a plurality of terminal devices 200.

Hereinabove, an example of a flow of processing in a case where the terminal device 200 relays the information regarding the CORESET to another terminal device 200 has been described with reference to FIG. 20.

Furthermore, in sidelink RRC, allocation of each sidelink CORSET is performed. At this time, the allocation of the CORESET may be performed for every resource pool, for example. That is, in a case where a plurality of resource pools is allocated, different CORESETs may be individually associated with each of the plurality of resource pools. Furthermore, a plurality of CORESETs may be set in a time domain and a frequency domain.

Figure 21:
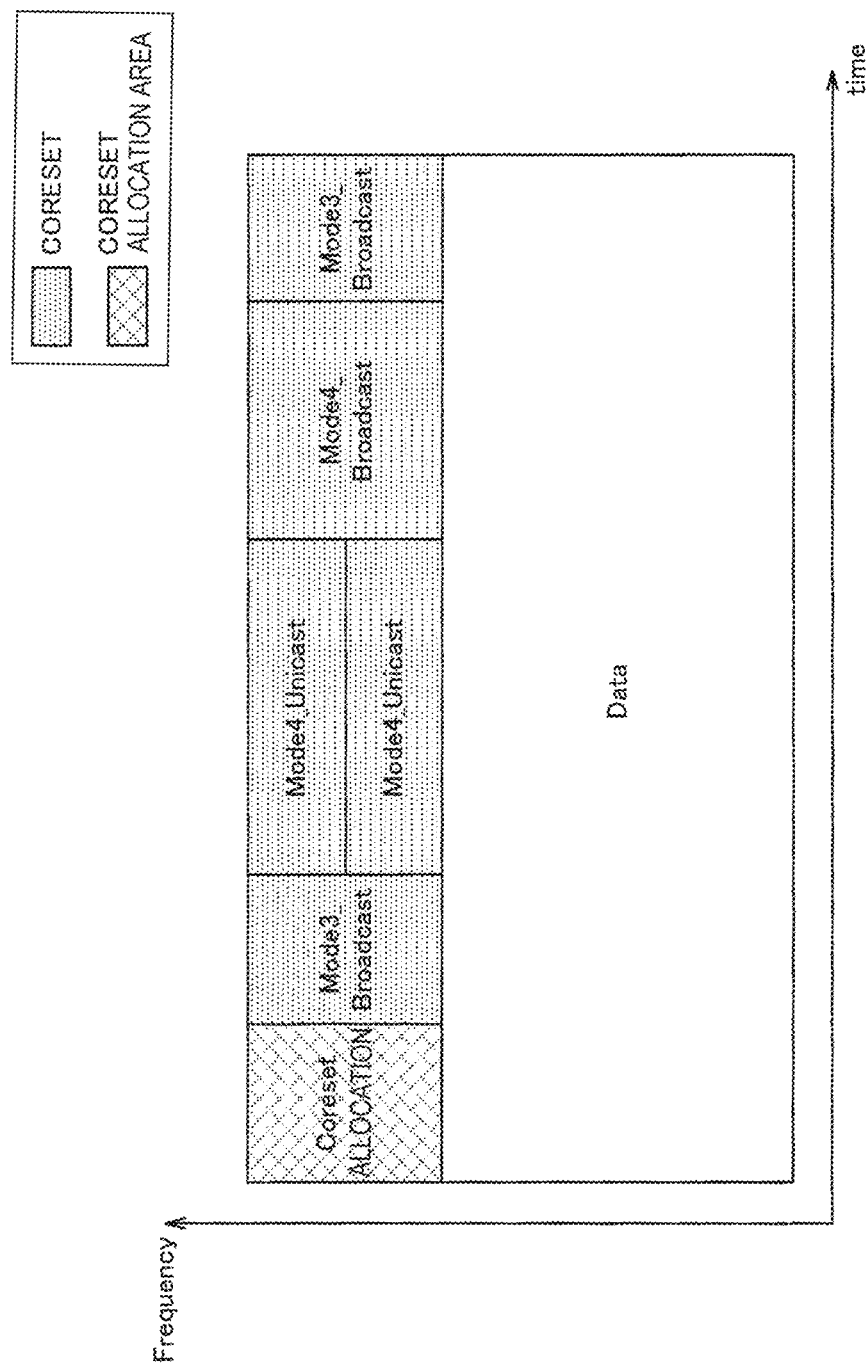
FIG. 21 is an explanatory diagram for describing another example of allocation of a sidelink CORESET.

Furthermore, as described above, a CORESET for CORESET allocation notification may be set. For example, FIG. 21 is an explanatory diagram for describing another example of allocation of a sidelink CORESET, and illustrates an example in a case where a CORESET for CORESET allocation notification is set. A horizontal axis and a vertical axis in the example illustrated in FIG. 21 indicate a time and a frequency, respectively, similarly to the example illustrated in FIG. 18.

In the example illustrated in FIG. 21, a CORESET for CORESET allocation notification is allocated, separately from an area to which CORESETs according to purposes of resources allocated to a data area are allocated, of a control area. The CORESET for CORESET allocation notification includes information regarding allocation of the other CORESETs subsequently allocated in the time domain (that is, CORESETs according to purposes of resources allocated in the data domain). Note that the area to which the CORESETs according to the purposes of the resources allocated to the data area are allocated, of the control area corresponds to an example of a "first partial area". On the other hand, an area to which the CORESET for CORESET allocation notification is allocated corresponds to an example of a "second partial area". Note that in this case, "information regarding a control resource set", particularly information regarding allocation of the CORESET, is allocated to the second partial area.

The CORESET for CORESET allocation notification is only required to be configured by, for example, the base station or be preconfigured. The terminal device 200 recognizes a configuration regarding allocation of the other CORESETs in a resource pool by first decoding the CORESET for CORESET allocation notification, and decodes a desired CORESET according to a result of the recognition. Due to such a characteristic, the CORESET for CORESET allocation notification is allocated before the area to which each of the CORESETs according to the purposes of the resources allocated to the data area is allocated in the time domain.

Furthermore, the allocation of the sidelink CORESET may be periodically performed. As a specific example, a series of CORESETs (that is, units of repetition) allocated as illustrated in FIG. 18 may be periodically allocated with the series of CORESETs as the unit of repetition (1 period).

Furthermore, the sidelink CORESET may be allocated so as to be associated with an area of a resource (for example, a resource pool, a sub-resource pool, or the like) common to the other CORESETs. That is, by associating CORESETs corresponding to different purposes with an area of at least some resources, the area of the resources may be used in a duplicate manner among a plurality of purposes different from each other. Note that in the following description, allocating a plurality of CORESETs so that the plurality of CORESETs is associated with an area of a certain resource is also referred to as "duplicate allocation" for convenience. Furthermore, in the following description, a description will be provided, mainly focusing on a case where the CORESET is associated with the resource pool, but the CORESET will not be limited to being associated with only the resource pool unless otherwise specified. That is, the same will apply to a case where the CORESET is associated with the sub-resource pool, and the same will apply to a case where the CORESET is associated with an area including one or more resources, as well as the resource pool or the sub-resource pool.

As a specific example, at least some resource pools may be used in a duplicate manner in Mode4_unicast and Mode3_unicast. In this case, for example, a CORESET for Mode4_unicast and a CORESET for Mode3_unicast may be associated with the resource pools.

Furthermore, permission for the duplicate use as described above may be performed by a device having authority regarding control of the sidelink communication, such as the base station 100 or the like. Furthermore, in this case, the device that has performed the permission for the duplicate use may notify the terminal device 200 of, for example, information indicating that the duplicate use is permitted for a target resource pool, information regarding the resource pool for which the duplicate use is permitted, or the like, as attribute information.

Furthermore, the device (for example, the base station 100) that has performed the permission for the duplicate use described above may notify the terminal device 200 of information regarding a trigger condition for permitting the duplicate use of the resource pool. Examples of the trigger condition include a channel busy ratio (CBR) of a target frequency band, a CBR of the CORESET, or the like. The CBR of the CORESET may be derived from, for example, use rates of at least some CORESETs (furthermore, use rates of all CORESETs) allocated to the control area, which are obtained by decoding the control area (control channel area). A channel occupancy ratio (CR) may be used as the trigger condition described above.

Figure 22:
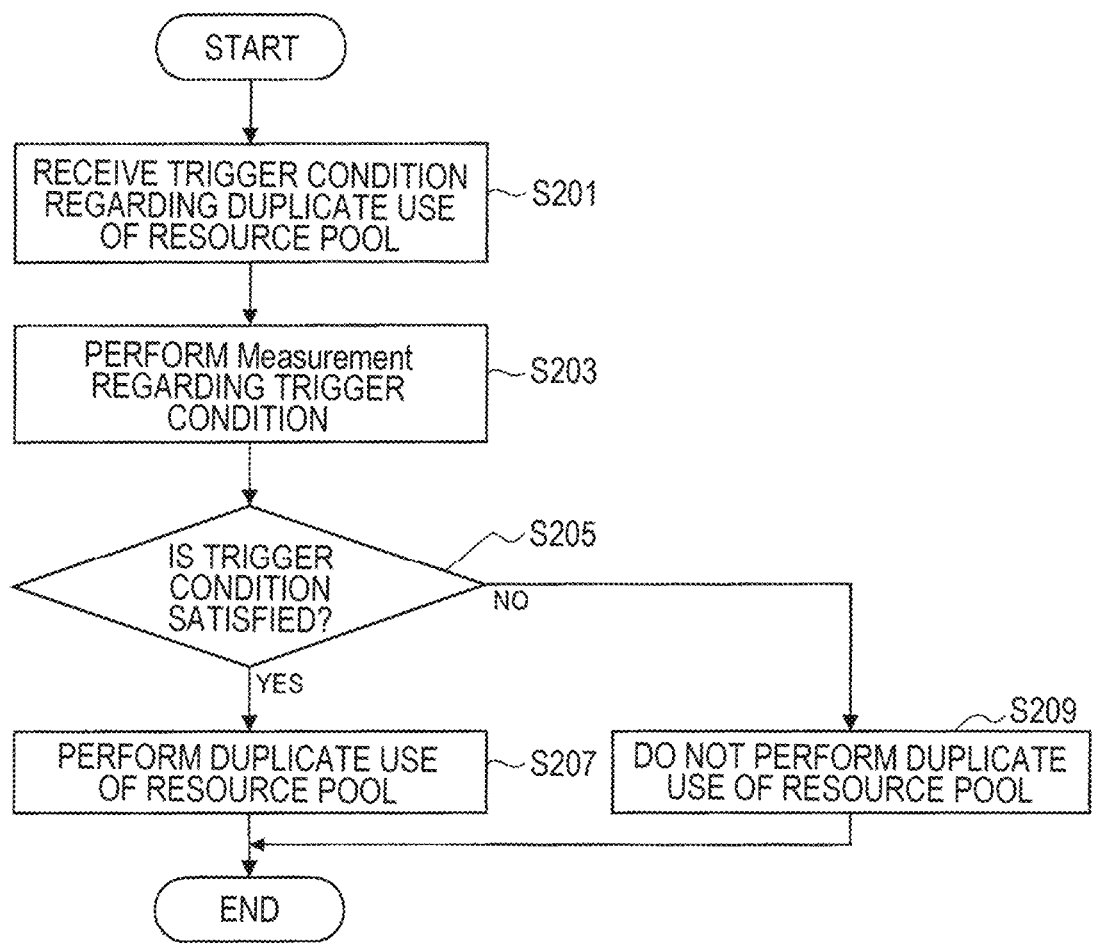
FIG. 22 is a flowchart illustrating an example of a flow of a series of processing of the terminal device according to the embodiment.

Here, an example of processing for performing duplicate use of the resource pool according to the trigger condition will be described as an example of a flow of a series of processing of the terminal device 200 with reference to FIG. 22. FIG. 22 is a flowchart illustrating an example of a flow of a series of processing of the terminal device according to the embodiment of the present disclosure, and illustrates an example of a flow of processing related to the duplicate use of the resource pool according to the trigger condition.

As illustrated in FIG. 22, the terminal device 200 (information acquisition unit 243) receives information regarding the trigger condition for permitting the duplicate use of the resource pool, transmitted from the device having the authority regarding the control of the sidelink communication, such as the base station 100 or the like (S201).

If the terminal device 200 receives the information regarding the trigger condition, the terminal device 200 (communication control unit 241) recognizes the trigger condition on the basis of the information, and performs measurement regarding the trigger condition to determine whether or not the trigger condition is satisfied (S203).

In a case where the terminal device 200 (communication control unit 241) determines from a result of the measurement that the trigger condition is satisfied (S205: YES), the terminal device 200 (communication control unit 241) performs duplicate use of a target resource pool (S207). That is, the terminal device 200 may perform the sidelink communication (inter-terminal communication) using a resource pool that is likely to be used in a duplicate manner. Note that in this case, there is a possibility that the resource pool will be used for different types of communication (for example, different traffic types of communication or different resource allocation modes of communication) depending on a situation at that time.

On the other hand, in a case where the terminal device 200 (communication control unit 241) determines from a result of the measurement that the trigger condition is not satisfied (S205: NO), the terminal device 200 (communication control unit 241) does not perform duplicate use of the resource pool (S209). In this case, the terminal device 200 may perform the sidelink communication (inter-terminal communication) using a resource pool that is not used in a duplicate manner.

Hereinabove, an example of processing for performing duplicate use of the resource pool according to the trigger condition has been described as an example of a flow of a series of processing of the terminal device 200 with reference to FIG. 22.

Furthermore, the CORESETs allocated to at least some partial area of the control area may be used for a plurality of purposes different from each other. In other words, a plurality of CORESETs different from each other may be allocated to at least some partial area of the control area. Note that in this case, for example, it may be necessary to distinguish between CORESETs corresponding to the plurality of purposes different from each other. Therefore, the plurality of CORESETs may be discriminated by, for example, a method such as a method of using different radio network temporary identifiers (RNTIs), a method of changing a search space, a method changing a monitoring period, or the like.

Furthermore, the CORESET may be configured across the sub-resource pool. That is, at least some CORESETs may be hopped in the frequency direction. Note that in this case, a hopping pattern of the CORESETs on a frequency is configured in the terminal device by using, for example, RRC signaling or the like.

Furthermore, a periodicity of the CORESET may be determined for every traffic. Note that in this case, information such as a packet size, a message size, a packet priority, a maximum delay allowance, a transmission period, a transmission method (unicast, group cast, or broadcast), and the like may be used as traffic information for determining the periodicity.

Figure 23:
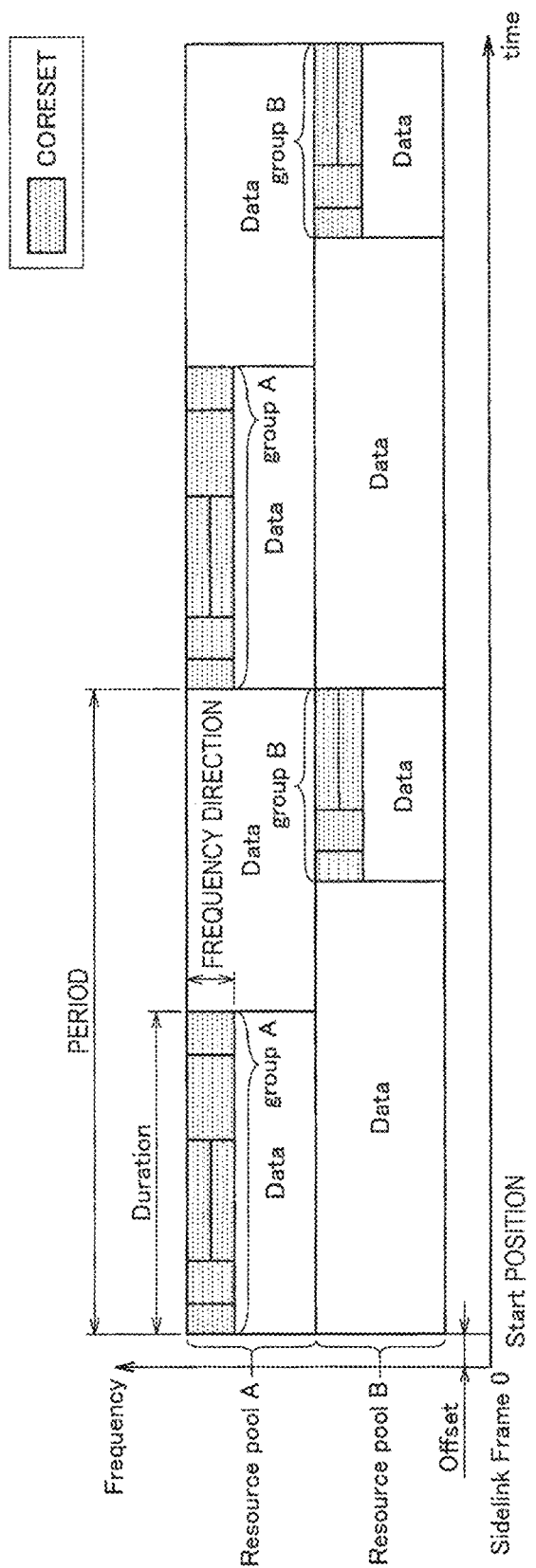
FIG. 23 is an explanatory diagram for describing an example of allocation of a CORESET group.

Furthermore, a CORESET group (control resource set group) may be defined. For example, FIG. 23 is an explanatory diagram for describing an example of allocation of a CORESET group. A horizontal axis and a vertical axis in the example illustrated in FIG. 23 indicate a time and a frequency, respectively, similarly to the example illustrated in FIG. 16.

A CORESET group is defined as one period of the CORESET and includes at least one or more CORESETs (includes a plurality of CORESETs in a typical example). Furthermore, the CORESET group may be allocated periodically. As a specific example, control such as allocating the CORESET group every 100 ms is also possible. Furthermore, the CORESET group may be defined as an area including not only the time domain but also the frequency domain.

Examples of parameters related to the allocation of the CORESET group include information regarding a start timing, information regarding a period and a duration, information regarding a frequency direction, and the like.

Examples of the information regarding the start timing include information such as a start timing of the CORESET group (that is, a start position in the time direction), and the like. The start timing may be defined as, for example, a value obtained by adding an offset amount from a predetermined timing in the sidelink with the predetermined timing (for example, sidelink frame number 0, or the like) as a reference.

Examples of the information regarding the period and the duration include information regarding the period of the CORESET, information such as a duration in which the CORSET group is allocated (that is, a width of the CORESET group in the time direction), and the like.

Examples of the information in the frequency direction include information such as a width of the CORESET or the CORESET group in the frequency direction, and the like.

The CORESET group may be defined for every resource pool, for example. As a specific example, in the example illustrated in FIG. 23, "Resource Pool A" and "Resource Pool B" are allocated as resource pools. On the basis of such a configuration, a CORESET group illustrated as "group A" is defined for "Resource Pool A", and a CORESET group illustrated as "group B" is defined for "Resource Pool B". Furthermore, the CORESET groups may be defined for a plurality of resource pools. In other words, at least some CORESET groups may be associated with a plurality of resource pools. That is, one CORESET group may configure a plurality of resource pools.

Furthermore, a plurality of CORESET groups different from each other may configure a plurality of resource pools. That is, two or more CORESET groups of a plurality of set CORESET groups may be associated with at least some resource pools (or at least some sub-resource pools). Furthermore, a configuration of each of the CORESET groups may be different for every resource pool.

Here, an example of the information included in the CORESET for CORESET allocation notification, described with reference to FIG. 21 will be described. Examples of the information included in the CORESET for CORESET allocation notification include information indicating an effective range in a time direction of an area to which the CORESET is allocated (that is, information indicating how far the area is defined).

Furthermore, in a case where the definition of the CORESET group described above is assumed, examples of the information included in the CORESET for CORESET allocation notification include information regarding the number of CORESETs included in the CORESET group. Furthermore, as the information included in the CORESET for CORESET allocation notification, information regarding a time frequency domain of each CORESET included in the CORESET group may be included. Furthermore, examples of the information included in the CORESET for CORESET allocation notification include information (type information) regarding an attribute and a type of each CORESET included in the CORESET group, information regarding a transmission traffic, priority information, and the like. Furthermore, examples of the priority information include information defining what level of priority of packet can be transmitted, and the like.

The CORESET for CORESET allocation notification may include information regarding allocation for a period of the plurality of COESETs. Furthermore, the CORESET for CORESET allocation notification may include information regarding allocation every predetermined period (for example, every 1 period).

Figure 24:
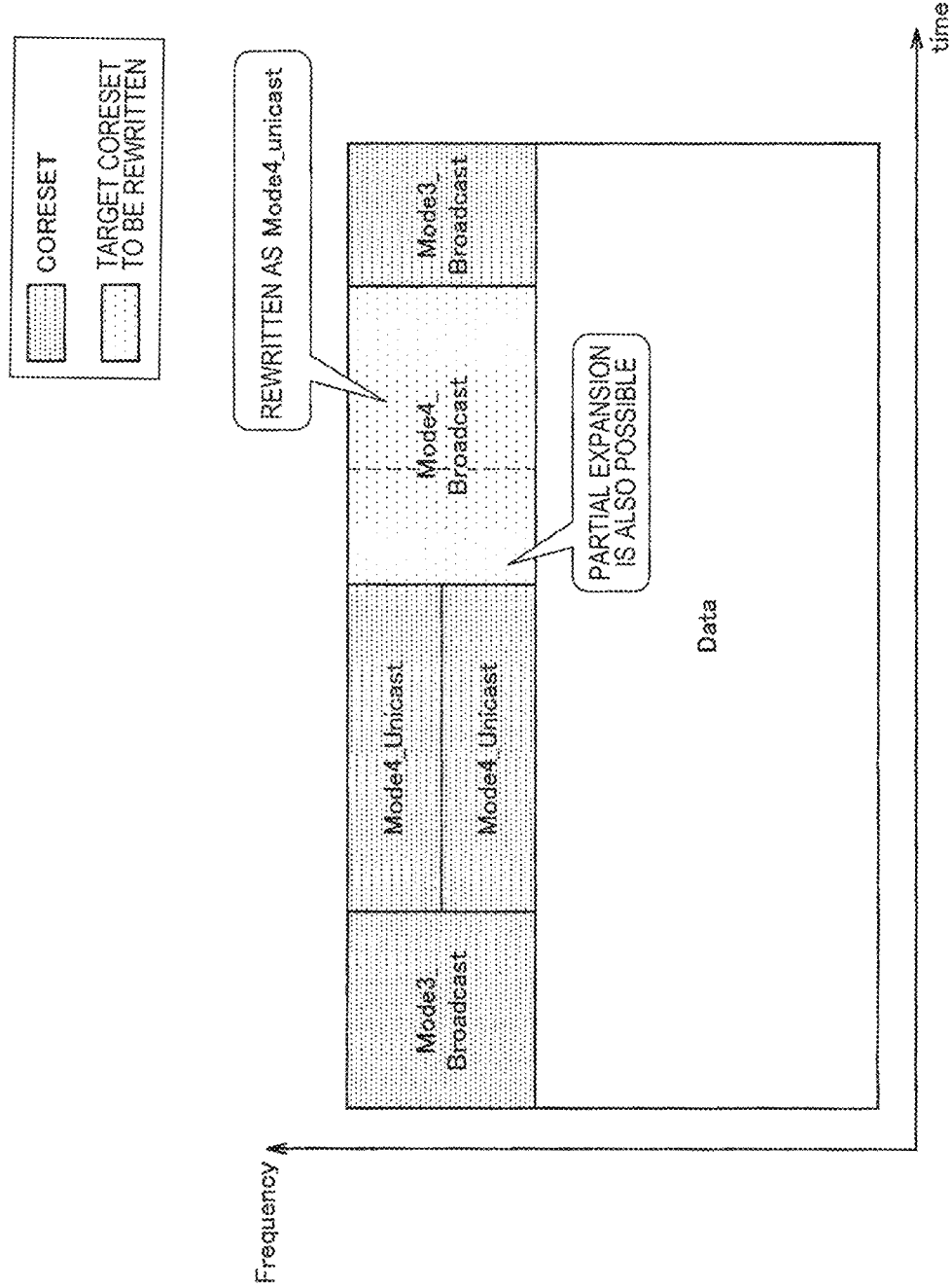
FIG. 24 is an explanatory diagram for describing an outline of a change of allocation of a CORESET.

Furthermore, the transmission terminal (terminal device 200) may perform overwriting of the setting of the CORESET or expansion of an allocation area for some CORESETs. In other words, the terminal device may make a change for the allocation of at least some COERSETs. For example, FIG. 24 is an explanatory diagram for describing an outline of a change of allocation of a CORESET. A horizontal axis and a vertical axis in the example illustrated in FIG. 24 indicate a time and a frequency, respectively, similarly to the example illustrated in FIG. 16.

Specifically, in a case where the transmission terminal has decided that some CORESETs have not been used by performing sensing, the transmission terminal may newly set the CORESETs to different CORESETs (for example, CORESETs corresponding to different purposes) again, and then use the CORESETs after the setting. Furthermore, the transmission terminal may overwrite another CORESET in an area of some CORESETs. For example, in the example illustrated in FIG. 24, a part of a CORESET corresponding to Mode4_Broadcast is rewritten (that is, overwritten) to a CORESET corresponding to Mode4_Unicast. Therefore, it becomes possible to expand a partial area to which the CORESET corresponding to Mode4_Unicast is allocated, among partial areas in the control area. Note that a partial area where the CORESET can be overwritten, in other words, a partial area where the CORESET corresponding to the plurality of purposes different from each other can be allocated may be set by, for example, the device having the authority regarding the control of the sidelink communication, such as the base station 100 or the like.

In a case where the transmission terminal (terminal device 200) makes a change (for example, overwriting, adding, or the like) for the allocation of the CORESET, the transmission terminal (terminal device 200) may notify another communication device (for example, another terminal device) of information regarding the changed allocation of the CORESET. In this case, the transmission terminal may notify another communication device of the information using, for example, sidelink RRC or the like. Furthermore, in a case where the transmission terminal has a possibility of expanding an area to which some CORESETs are allocated, the transmission terminal may notify another communication device (for example, another terminal device) of information regarding suggestion of the possibility in advance. In this case, for example, another terminal device (reception terminal) that receives data transmitted from the transmission terminal may decode the CORESET allocated to the area in which the possibility of the expansion is indicated on the basis of the information notification of which is provided from the transmission terminal. Furthermore, the expansion of the area to which the CORESET is allocated may be partially performed. Specifically, expansion of an area to which another CORESET is allocated may be performed by overwriting another CORESET in only some partial area of an area to which a certain CORESET is allocated.

Figure 25:
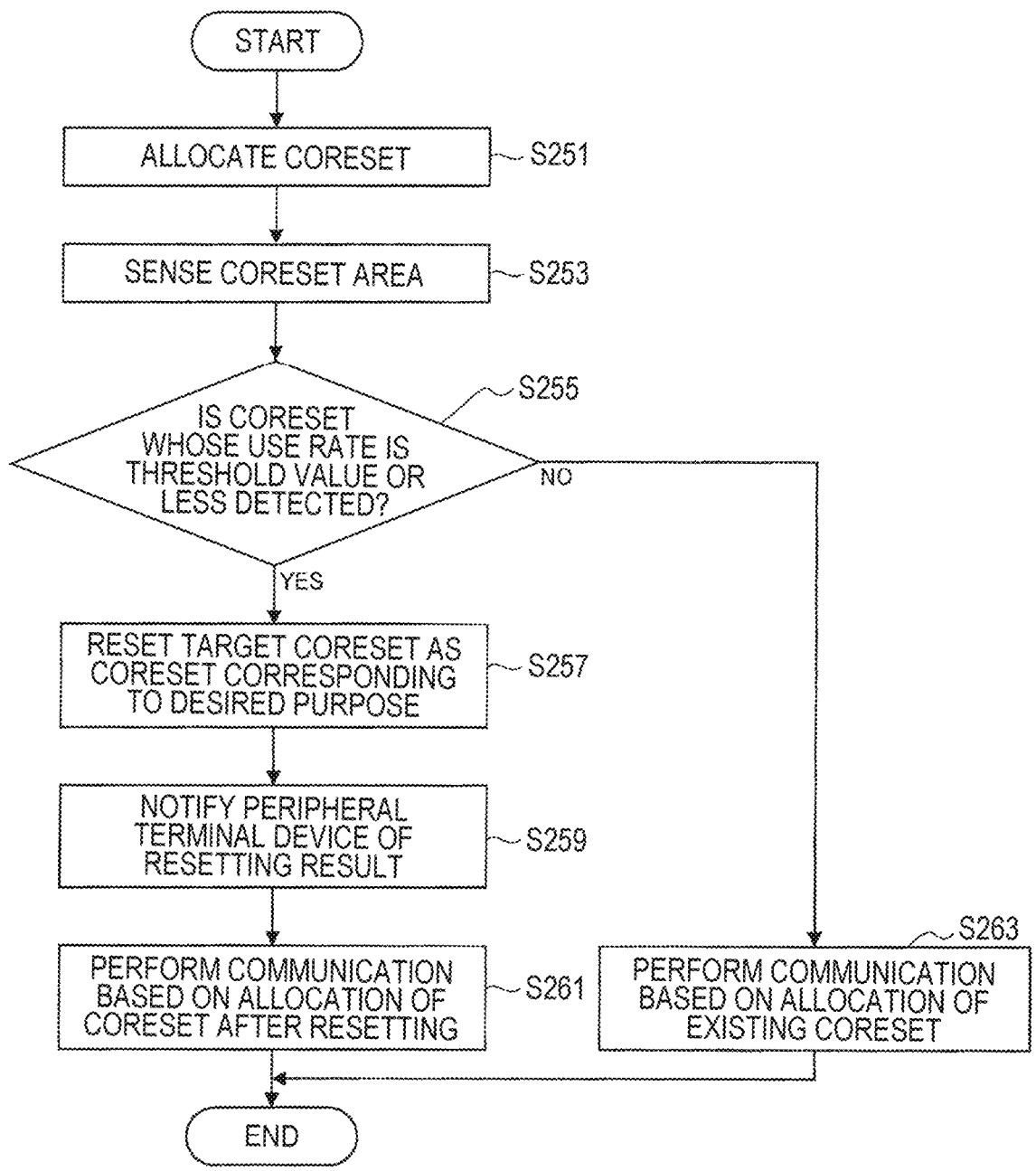
FIG. 25 is a flowchart illustrating an example of a flow of processing related to resetting of a CORESET.

Here, an example of a flow of processing related to resetting (for example, overwriting) of a CORESET will be described with reference to FIG. 25. FIG. 25 is a flowchart illustrating an example of a flow of processing related to resetting of a CORESET.

First, a CORESET is allocated by the device having the authority regarding the control of the sidelink communication, such as the base station 100 or the like (S251). Furthermore, the terminal device 200 (information acquisition unit 243) measures, for example, use rates of at least some CORESETs of a series of CORESETs by sensing an area to which the CORESET is allocated (S253).

In a case where the terminal device 200 has detected CORESETs whose use rates are a threshold value or less (S255: YES), the terminal device 200 (communication control unit 241) resets at least some of the CORESETs as a CORESET corresponding to a desired purpose (S257). Furthermore, in this case, the terminal device 200 (notification unit 247) may notify other peripheral terminal devices of a result of the resetting (S259). Then, the terminal device 200 performs communication (for example, sidelink communication) on the basis of allocation of the CORESET after the resetting (S261).

On the other hand, in a case where the terminal device 200 has not detected CORESETs whose use rates are a threshold value or less (S255: NO), the terminal device 200 (communication control unit 241) performs communication (for example, sidelink communication) on the basis of allocation of the existing CORESET (S263).

Hereinabove, an example of a flow of processing related to resetting (for example, overwriting) of a CORESET has been described with reference to FIG. 25.

Furthermore, the terminal device 200 may calculate a CBR (hereinafter, also referred to as a "CORESET_CBR") or a CR (hereinafter, also referred to as a "COREEST_CR") of each CORESET. The calculation is performed on the basis of, for example, a CBR or a CR in the area where CORESET is allocated. Note that whether or not the terminal device 200 performs the calculation may be set by the device having the authority regarding the control of the sidelink communication such as the base station 100 or the like.

Furthermore, the terminal device 200 may report information according to a calculation result of the CORESET_CBR or the CORESET_CR to the device having the authority regarding the control of the sidelink communication such as the base station 100 or the like. Therefore, the device that has received the report can also change the setting of the CORESET in view of a content of the report. Furthermore, the terminal device 200 may notify the device having the authority regarding the control of the sidelink communication such as the base station 100 or the like of a request for changing the CORESET, and may associate the information according to the calculation result of the CORESET_CBR or the CORESET_CR with the notification.

<6.3. Securing of Resource in Area of Control Channel>

Next, a technical feature of the system according to the present embodiment will be described from the viewpoint of securing a resource in an area of a control channel.

After the CORESET is set, the transmission terminal (terminal device 200) secures a resource associated with a CORESET for packet transmission, and transmits a packet using the resource. Examples of a method of securing a resource include a method of allocating a resource by the device having the authority regarding the control of the sidelink communication such as the base station 100 or the like and a method of autonomously allocating a resource by sensing by the terminal device 200 itself. In a case of the method of allocating a resource by the device having the authority regarding the control of the sidelink communication, there is basically no possibility that resource collision will occur. Therefore, hereinafter, the method of autonomously allocating a resource by sensing by the terminal device 200 itself will be mainly described.

The terminal device 200 may select a CORESET on the basis of, for example, parameters shown below when selecting a resource for packet transmission.

CBR

CR

Location information of terminal device

Information regarding packet to be transmitted

Furthermore, in V2X communication in a sidelink, there may be a restriction called a so-called half duplex (HD) that transmission and reception are limited to being performed in a time division manner, such that the transmission or the reception cannot be always performed. In order to prevent occurrence of a situation in which the transmission or the reception is restricted (hereinafter, also referred to as a "HD problem") due to the restriction of such an HD, it is desirable that the transmission terminal (terminal device 200) refrains from continuous transmission in the time direction as much as possible, and it is more desirable that the transmission terminal (terminal device 200) secures as many resources in the frequency direction as possible. From such a situation, the transmission terminal may introduce a mapping pattern in order to avoid a situation in which continuous transmission is performed in the time direction.

Figure 26:
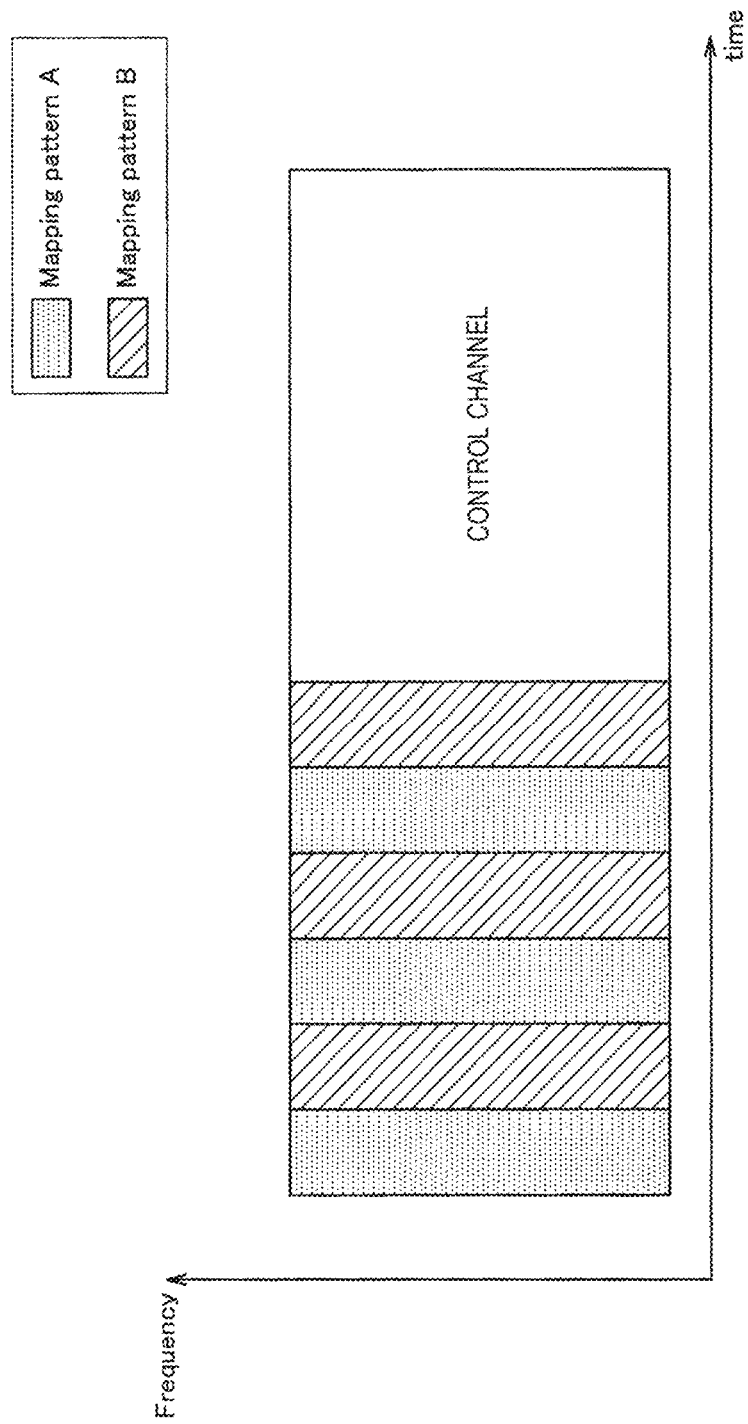
FIG. 26 is an explanatory diagram for describing an outline of a mapping pattern.

For example, FIG. 26 is an explanatory diagram for describing an outline of a mapping pattern. A horizontal axis and a vertical axis in the example illustrated in FIG. 26 indicate a time and a frequency, respectively, similarly to the example illustrated in FIG. 16. Specifically, in the example illustrated in FIG. 26, "Mapping pattern A" and "Mapping pattern B" are set as mapping patterns, and allocation of resources performed according to a mapping pattern to be applied is performed. At this time, the mapping patterns are set so as to be orthogonal to each other in the time frequency domain. By setting the mapping patterns as described above, it becomes possible to avoid occurrence of a situation in which resources are continuously allocated in the time direction.

The mapping pattern may be set in the terminal device 200 by the device having the authority regarding the control of the sidelink communication such as the base station 100 or the like or may be set in the terminal device 200 by preconfiguration. The transmission terminal (terminal device 200) may associate information regarding the mapping pattern with sidelink control information (SCI) in order to notify the reception terminal (another terminal device 200) of the selected mapping pattern. Furthermore, as another example, a CORESET for notification of the mapping pattern may be defined. Furthermore, as another example, blind decoding may be performed for every mapping pattern on a reception terminal side.

7. Application Example

The technology according to the present disclosure can be applied to various products. For example, the base station 100 may be realized as any type of evolved Node B (eNB) such as a macro eNB, a small eNB, or the like. The small eNB may be an eNB that covers a cell smaller than a macro cell, such as a pico eNB, a micro eNB, a home (femto) eNB, or the like. Instead, the base station 100 may be realized as another type of base station such as a Node B, a base transceiver station (BTS), or the like. The base station 100 may include a main body (also referred to as a base station device) that controls wireless communication and one or more remote radio heads (RRHs) that are arranged at places different from the main body. Furthermore, various types of terminals as described later may operate as the base station 100 by temporarily or semi-permanently executing a base station function.

Furthermore, for example, the terminal device 200 or 300 may be realized as a smartphone, a tablet personal computer (PC), a laptop PC, a portable game terminal, a mobile terminal such as a portable/dongle-type mobile router, a digital camera or the like, or an in-vehicle terminal such as a car navigation device or the like. Furthermore, the terminal device 200 or 300 may be realized as a terminal (also referred to as a machine type communication (MTC) terminal) that performs machine to machine (M2M) communication. Moreover, the terminal device 200 or 300 may be a wireless communication module (for example, an integrated circuit module configured by one base station 100 die) that is mounted on these terminals.

<7.1. Application Example Related to Base Station>

First Application Example

Figure 27:
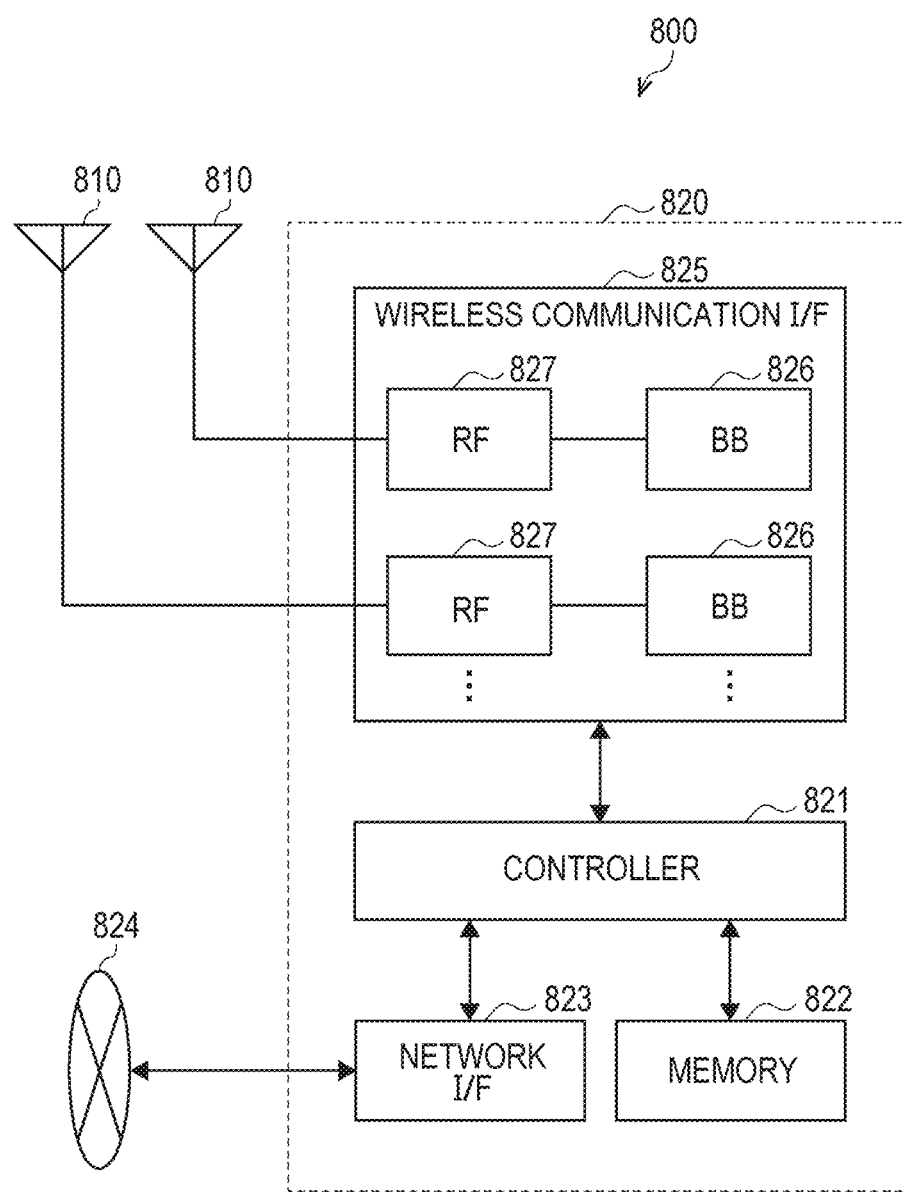
FIG. 27 is a block diagram illustrating a first example of a schematic configuration of an eNB.

FIG. 27 is a block diagram illustrating a first example of a schematic configuration of an eNB to which the technology according to the present disclosure can be applied. The eNB 800 includes one or more antennas 810 and a base station device 820. Each antenna 810 and the base station device 820 can be connected to each other via a radio frequency (RF) cable.

Each of the antennas 810 has a single or a plurality of antenna elements (for example, a plurality of antenna elements configuring a MIMO antenna), and is used to transmit and receive a radio signal by the base station device 820. The eNB 800 includes a plurality of antennas 810 as illustrated in FIG. 27, and the plurality of antennas 810 may correspond to, for example, a plurality of frequency bands used by the eNB 800, respectively. Note that an example in which the eNB 800 includes the plurality of antennas 810 has been illustrated in FIG. 27, but the eNB 800 may include a single antenna 810.

The base station device 820 includes a controller 821, a memory 822, a network interface 823, and a wireless communication interface 825.

The controller 821 may be, for example, a central processing unit (CPU) or a digital signal processor (DSP) and operates various functions of an upper layer of the base station device 820. For example, the controller 821 generates a data packet from data in a signal processed by the wireless communication interface 825 and transfers the generated data packet via the network interface 823. The controller 821 may generate a bundled packet by bundling data from a plurality of baseband processors and transfer the generated bundled packet. Furthermore, the controller 821 may have a logical function of executing control such as radio resource control, radio bearer control, mobility management, admission control, scheduling, or the like. Furthermore, the control may be executed in cooperation with a peripheral eNB or a core network node. The memory 822 includes a random access memory (RAM) and a read only memory (ROM), and stores a program executed by the controller 821 and various control data (for example, terminal list, transmission power data, scheduling data, and the like).

The network interface 823 is a communication interface for connecting the base station device 820 to a core network 824. The controller 821 may communicate with the core network node or another eNBs via the network interface 823. In that case, the eNB 800 and the core network node or another eNB may be connected to each other by a logical interface (for example, an S1 interface or an X2 interface). The network interface 823 may be a wired communication interface or a wireless communication interface for a wireless backhaul. In a case where the network interface 823 is the wireless communication interface, the network interface 823 may use a frequency band higher than a frequency band used by the wireless communication interface 825 for wireless communication.

The wireless communication interface 825 supports any one cellular communication mode such as long term evolution (LTE), LTE-Advanced or the like, and provides a wireless connection to a terminal located in a cell of the eNB 800 via the antenna 810. The wireless communication interface 825 can typically include a baseband (BB) processor 826, a radio frequency (RF) circuit 827, and the like. The BB processor 826 may execute, for example, coding/decoding, modulation/demodulation, multiplexing/demultiplexing, and the like, and executes various signal processing of each layer (for example, L1, medium access control (MAC), radio link control (RLC), and packet data convergence protocol (PDCP)). The BB processor 826 may have some or all of the logical functions described above instead of the controller 821. The BB processor 826 may be a module including a memory that stores a communication control program, a processor that executes the communication control program, and a related circuit, and a function of the BB processor 826 may be changeable by updating the communication control program. Furthermore, the module may be a card or a blade inserted into a slot of the base station device 820 or may be a chip mounted on the card or the blade. Meanwhile, the RF circuit 827 may include a mixer, a filter, an amplifier, and the like, and transmits and receives a radio signal via the antenna 810.

The wireless communication interface 825 includes a plurality of BB processors 826 as illustrated in FIG. 27, and the plurality of BB processors 826 may correspond to, for example, the plurality of frequency bands used by the eNB 800, respectively. Furthermore, the wireless communication interface 825 includes a plurality of RF circuits 827 as illustrated in FIG. 27, and the plurality of RF circuits 827 may correspond to, for example, the plurality of antenna elements, respectively. Note that an example in which the wireless communication interface 825 includes the plurality of BB processors 826 and the plurality of RF circuits 827 has been illustrated in FIG. 27, but the wireless communication interface 825 may include a single BB processor 826 or a single RF circuit 827.

In the eNB 800 illustrated in FIG. 27, one or more components (for example, at least one of the communication control unit 151, the information acquisition unit 153, or the notification unit 155) included in the base station 100 described with reference to FIG. 2 may be implemented in the wireless communication interface 825. Alternatively, at least some of these components may be implemented in the controller 821. As an example, the eNB 800 may be mounted with a module including a part (for example, the BB processor 826) or the whole of the wireless communication interface 825 and/or the controller 821, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the eNB 800, and the wireless communication interface 825 (for example, the BB processor 826) and/or the controller 821 may execute the program. As described above, the eNB 800, the base station device 820, or the module may be provided or the program for causing the processor to function as the one or more components may be provided, as a device including the one or more components. Furthermore, a readable recording medium on which the program is recorded may be provided.

Furthermore, in the eNB 800 illustrated in FIG. 27, the wireless communication unit 120 described with reference to FIG. 2 may be implemented in the wireless communication interface 825 (for example, the RF circuit 827). Furthermore, the antenna unit 110 may be implemented in the antenna 810. Furthermore, the network communication unit 130 may be implemented in the controller 821 and/or the network interface 823. Furthermore, the storage unit 140 may be implemented in the memory 822.

Second Application Example

Figure 28:
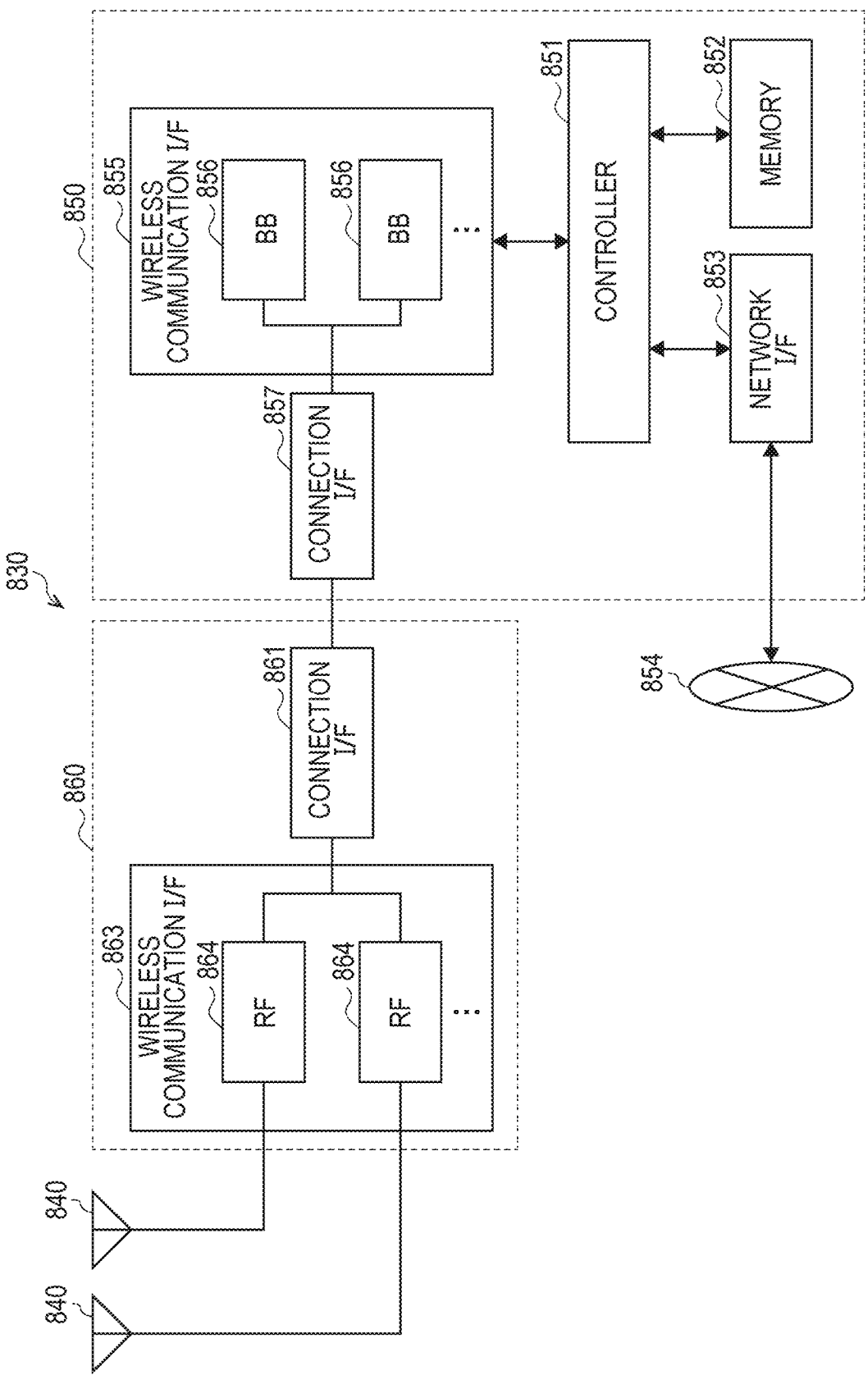
FIG. 28 is a block diagram illustrating a second example of a schematic configuration of an eNB.

FIG. 28 is a block diagram illustrating a second example of a schematic configuration of an eNB to which the technology according to the present disclosure can be applied. The eNB 830 includes one or more antennas 840, a base station device 850, and an RRH 860. Each antenna 840 and the RRH 860 can be connected to each other via an RF cable. Furthermore, the base station device 850 and the RRH 860 can be connected to each other by a high-speed line such as an optical fiber cable or the like.

Each of the antennas 840 has a single or a plurality of antenna elements (for example, a plurality of antenna elements configuring a MIMO antenna), and is used to transmit and receive a radio signal by the RRH 860. The eNB 830 includes a plurality of antennas 840 as illustrated in FIG. 28, and the plurality of antennas 840 may correspond to, for example, a plurality of frequency bands used by the eNB 830, respectively. Note that an example in which the eNB 830 includes the plurality of antennas 840 has been illustrated in FIG. 28, but the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 27, respectively.

The wireless communication interface 855 supports any one cellular communication mode such as LTE, LTE-Advanced, or the like, and provides a wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 27 except that it is connected to an RF circuit 864 of the RRH 860 via the connection interface 857. The wireless communication interface 855 includes a plurality of BB processors 856 as illustrated in FIG. 28, and the plurality of BB processors 856 may correspond to, for example, the plurality of frequency bands used by the eNB 830, respectively. Note that an example in which the wireless communication interface 855 includes the plurality of BB processors 856 has been illustrated in FIG. 28, but the wireless communication interface 855 may include a single BB processor 856.

The connection interface 857 is an interface for connecting the base station device 850 (wireless communication interface 855) to the RRH 860. The connection interface 857 may be a communication module for communication on the high-speed line connecting the base station device 850 (wireless communication interface 855) and the RRH 860 to each other.

Furthermore, the RRH 860 also includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives a radio signal via the antenna 840. The wireless communication interface 863 may typically include an RF circuit 864 and the like. The RF circuit 864 may include a mixer, a filter, an amplifier, and the like, and transmits and receives a radio signal via the antenna 840. The wireless communication interface 863 includes a plurality of RF circuits 864 as illustrated in FIG. 28, and the plurality of RF circuits 864 may correspond to, for example, the plurality of antenna elements, respectively. Note that an example in which the wireless communication interface 863 includes the plurality of RF circuits 864 has been illustrated in FIG. 28, but the wireless communication interface 863 may include a single RF circuit 864.

In the eNB 830 illustrated in FIG. 28, one or more components (for example, at least one of the communication control unit 151, the information acquisition unit 153, or the notification unit 155) included in the base station 100 described with reference to FIG. 2 may be implemented in the wireless communication interface 855 and/or the wireless communication interface 863. Alternatively, at least some of these components may be implemented in the controller 851. As an example, the eNB 830 may be mounted with a module including a part (for example, the BB processor 856) or the whole of the wireless communication interface 855 and/or the controller 851, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the eNB 830, and the wireless communication interface 855 (for example, the BB processor 856) and/or the controller 851 may execute the program. As described above, the eNB 830, the base station device 850, or the module may be provided or the program for causing the processor to function as the one or more components may be provided, as a device including the one or more components. Furthermore, a readable recording medium on which the program is recorded may be provided.

Furthermore, in the eNB 830 illustrated in FIG. 28, for example, the wireless communication unit 120 described with reference to FIG. 2 may be implemented in the wireless communication interface 863 (for example, the RF circuit 864). Furthermore, the antenna unit 110 may be implemented in the antenna 840. Furthermore, the network communication unit 130 may be implemented in the controller 851 and/or the network interface 853. Furthermore, the storage unit 140 may be implemented in the memory 852.

<7.2. Application Example Related to Terminal Device>

First Application Example

Figure 29:
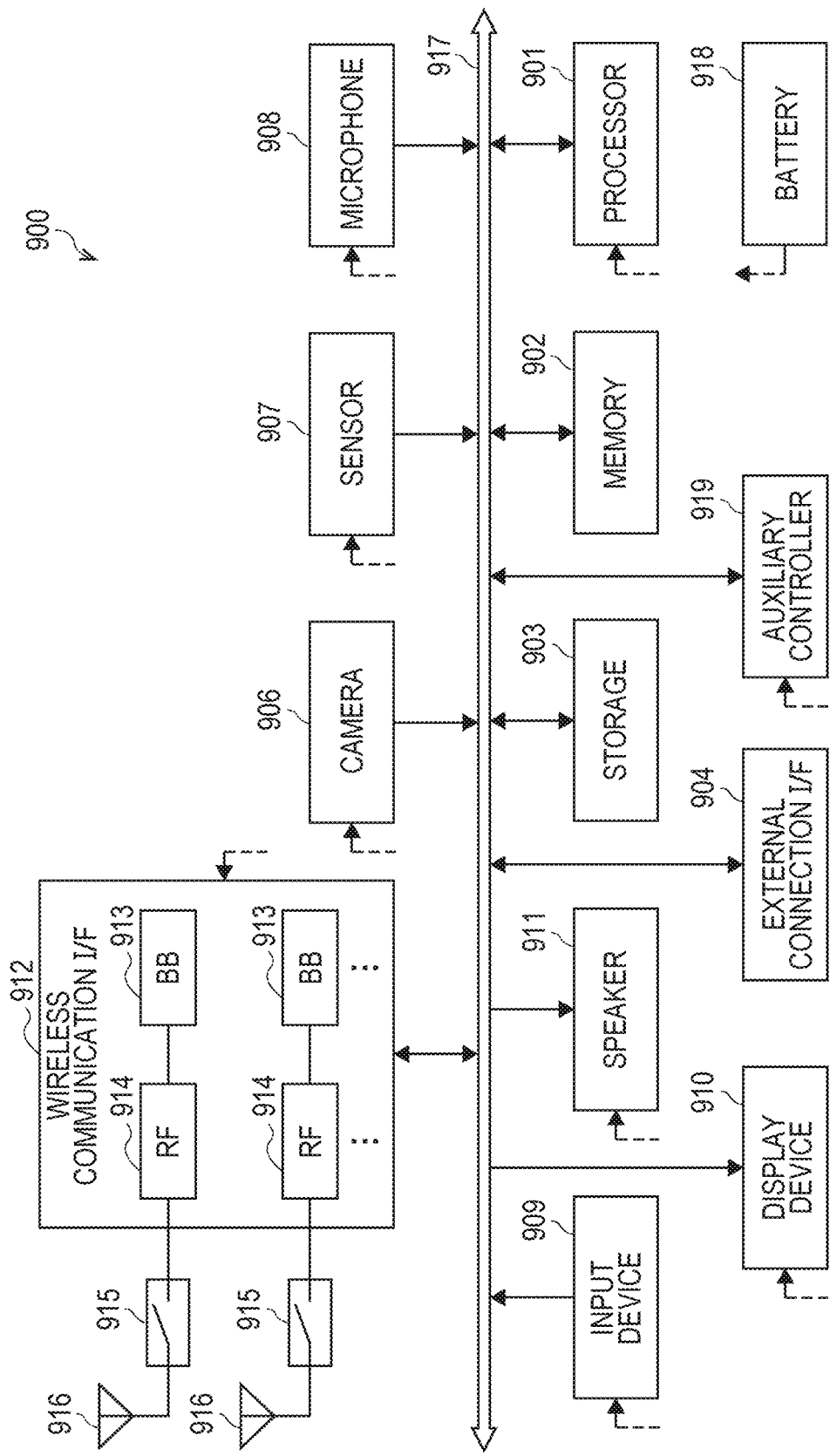
FIG. 29 is a block diagram illustrating an example of a schematic configuration of a smartphone.

FIG. 29 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores a program executed by the processor 901 and data. The storage 903 can include a storage medium such as a semiconductor memory, a hard disk, or the like. The external connection interface 904 is an interface for connecting an externally attached device such as a memory card, a universal serial bus (USB) device, or the like to the smartphone 900.

The camera 906 includes, for example, an imaging element such as a charge coupled device (CCD), a complementary metal oxide semiconductor (CMOS), or the like, and generates a captured image. The sensor 907 can include a sensor group such as, for example, a positioning sensor, a gyro sensor, a geomagnetic sensor, an acceleration sensor, and the like. The microphone 908 converts a sound input into the smartphone 900 to an audio signal. The input device 909 includes, for example, a touch sensor that detects a touch on a screen of the display device 910, a keypad, a keyboard, a button, a switch, or the like, and accepts an operation or an information input from a user. The display device 910 includes a screen such as a liquid crystal display (LCD), an organic light emitting diode (OLED) display, or the like, and displays an output image of the smartphone 900. The speaker 911 converts an audio signal output from the smartphone 900 to a sound.

The wireless communication interface 912 supports any one cellular communication mode such as LTE, LTE-Advanced, or the like, and executes wireless communication. The wireless communication interface 912 can typically include a BB processor 913, an RF circuit 914, and the like. The BB processor 913 may perform, for example, coding/decoding, modulation/demodulation, multiplexing/demultiplexing, and the like, and performs various signal processing for wireless communication. Meanwhile, the RF circuit 914 may include a mixer, a filter, an amplifier, and the like, and transmits and receives a radio signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 29. Note that an example in which the wireless communication interface 912 includes the plurality of BB processors 913 and the plurality of RF circuits 914 has been illustrated in FIG. 29, but the wireless communication interface 912 may include a single BB processor 913 or a single RF circuit 914.

Moreover, the wireless communication interface 912 may support other types of wireless communication modes such as a short-range wireless communication mode, a near field wireless communication mode, a wireless local area network (LAN) mode, or the like, in addition to the cellular communication mode. In that case, the wireless communication interface 912 may include the BB processor 913 and the RF circuit 914 for every wireless communication mode.

Each of the antenna switches 915 switches a connection destination of the antenna 916 among a plurality of circuits (for example, circuits for different wireless communication modes) included in the wireless communication interface 912.

Each of the antennas 916 has a single or a plurality of antenna elements (for example, a plurality of antenna elements configuring a MIMO antenna), and is used to transmit and receive a radio signal by the wireless communication interface 912. The smartphone 900 may include a plurality of antennas 916 as illustrated in FIG. 29. Note that an example in which the smartphone 900 includes the plurality of antennas 916 has been illustrated in FIG. 29, but the smartphone 900 may include a single antenna 916.

Moreover, the smartphone 900 may include the antenna 916 for every wireless communication mode. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 29 via feeding lines partially illustrated as broken lines in FIG. 29. The auxiliary controller 919 operates a minimum necessary function of the smartphone 900 in, for example, a sleep mode.

In the smartphone 900 illustrated in FIG. 29, one or more components (for example, at least one of the communication control unit 241, the information acquisition unit 243, or the notification unit 247) included in the terminal device 200 described with reference to FIG. 3 may be implemented in the wireless communication interface 912. Alternatively, at least some of these components may be implemented in the processor 901 or the auxiliary controller 919. As an example, the smartphone 900 may be mounted with a module including a part (for example, the BB processor 913) or the whole of the wireless communication interface 912, the processor 901, and/or the auxiliary controller 919, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the smartphone 900, and the wireless communication interface 912 (for example, the BB processor 913), the processor 901, and/or the auxiliary controller 919 may execute the program. As described above, the smartphone 900 or the module may be provided or the program for causing the processor to function as the one or more components may be provided, as a device including the one or more components. Furthermore, a readable recording medium on which the program is recorded may be provided.

Furthermore, in the smartphone 900 illustrated in FIG. 29, for example, the wireless communication unit 220 described with reference to FIG. 3 may be implemented in the wireless communication interface 912 (for example, the RF circuit 914). Furthermore, the antenna unit 210 may be implemented in the antenna 916. Furthermore, the storage unit 230 may be implemented in the memory 902.

Second Application Example

Figure 30:
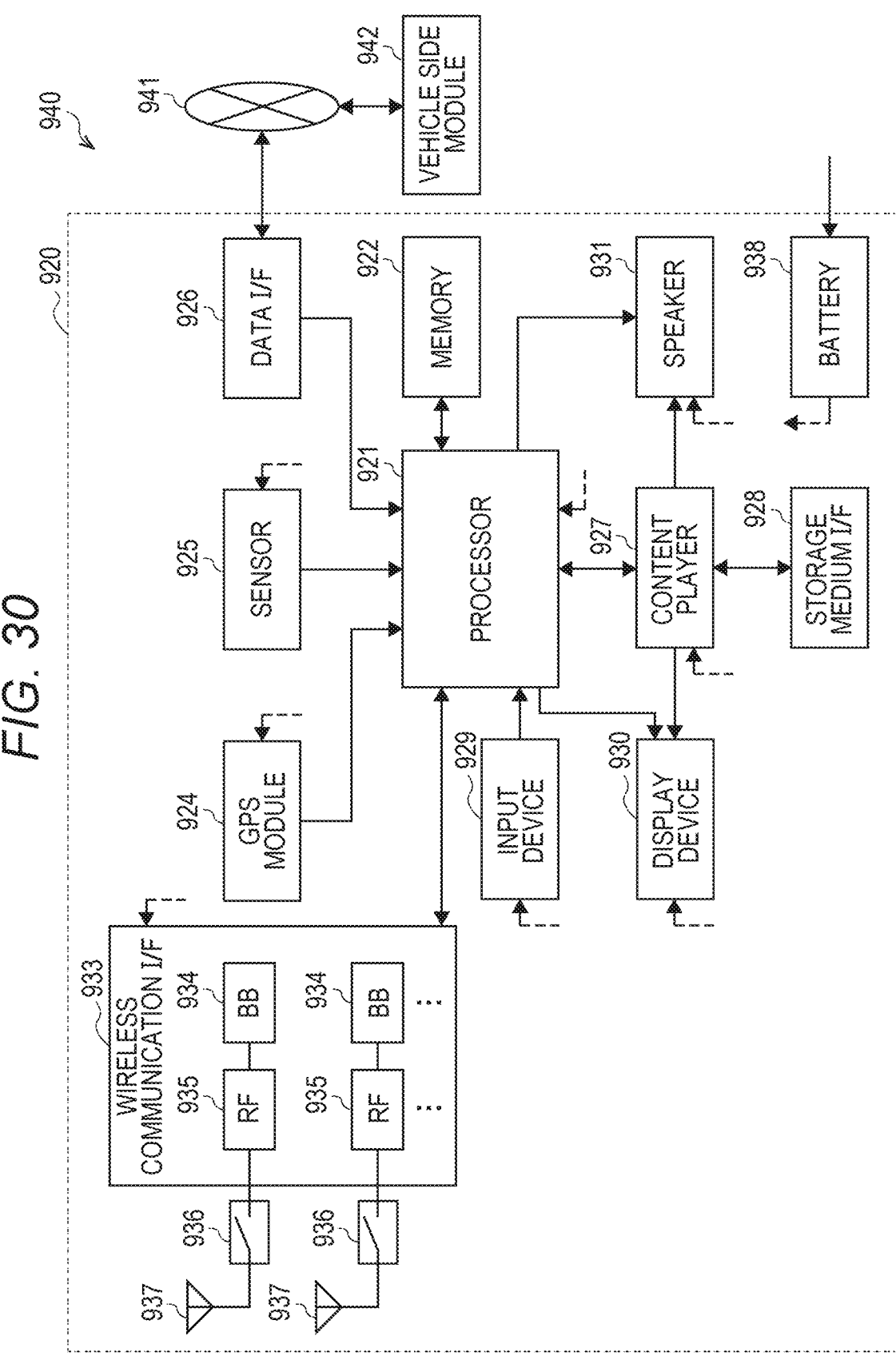
FIG. 30 is a block diagram illustrating an example of a schematic configuration of a car navigation device.

FIG. 30 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and the other functions of the car navigation device 920. The memory 922 includes a RAM and a ROM, and stores a program executed by the processor 921 and data.

The GPS module 924 measures a position (for example, a latitude, a longitude, and an altitude) of the car navigation device 920 using a GPS signal received from a GPS satellite. The sensor 925 can include a sensor group such as, for example, a gyro sensor, a geomagnetic sensor, a barometric sensor, and the like. The data interface 926 is, for example, connected to an in-vehicle network 941 via a terminal (not illustrated), and acquires data such as vehicle speed data or the like generated on a vehicle side.

The content player 927 plays a content stored in a storage medium (for example, a compact disk (CD) or a digital versatile disk (DVD)) inserted into the storage medium interface 928. The input device 929 includes, for example, a touch sensor that detects a touch on a screen of the display device 930, a button, a switch, or the like, and accepts an operation or an information input from a user. The display device 930 includes a screen such as an LCD, an OLED display, or the like, and displays an image of a navigation function or the played content. The speaker 931 outputs a sound of the navigation function or the played content.

The wireless communication interface 933 supports any one cellular communication mode such as LTE, LTE-Advanced, or the like, and executes wireless communication. The wireless communication interface 933 can typically include a BB processor 934, an RF circuit 935, and the like. The BB processor 934 may perform, for example, coding/decoding, modulation/demodulation, multiplexing/demultiplexing, and the like, and performs various signal processing for wireless communication. Meanwhile, the RF circuit 935 may include a mixer, a filter, an amplifier, and the like, and transmits and receives a radio signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 30. Note that an example in which the wireless communication interface 933 includes the plurality of BB processors 934 and the plurality of RF circuits 935 has been illustrated in FIG. 30, but the wireless communication interface 933 may include a single BB processor 934 or a single RF circuit 935.

Moreover, the wireless communication interface 933 may support other types of wireless communication modes such as a short-range wireless communication mode, a near field wireless communication mode, a wireless LAN mode, or the like, in addition to the cellular communication mode. In that case, the wireless communication interface 933 may include the BB processor 934 and the RF circuit 935 for every wireless communication mode.

Each of the antenna switches 936 switches a connection destination of the antenna 937 among a plurality of circuits (for example, circuits for different wireless communication modes) included in the wireless communication interface 933.

Each of the antennas 937 has a single or a plurality of antenna elements (for example, a plurality of antenna elements configuring a MIMO antenna), and is used to transmit and receive a radio signal by the wireless communication interface 933. The car navigation device 920 may include a plurality of antennas 937 as illustrated in FIG. 30. Note that an example in which the car navigation device 920 includes the plurality of antennas 937 has been illustrated in FIG. 30, but the car navigation device 920 may include a single antenna 937.

Moreover, the car navigation device 920 may include an antenna 937 for every wireless communication mode. In that case, the antenna switch 936 may be omitted from the configuration of the car navigation device 920.

The battery 938 supplies power to each block of the car navigation device 920 illustrated in FIG. 30 via a feeder line partially illustrated as a broken line in FIG. 30. Furthermore, the battery 938 accumulates power supplied from the vehicle.

In the car navigation device 920 illustrated in FIG. 30, one or more components (for example, at least one of the communication control unit 241, the information acquisition unit 243, or the notification unit 247) included in the terminal device 200 described with reference to FIG. 3 may be implemented in the wireless communication interface 933. Alternatively, at least some of these components may be implemented in the processor 921. As an example, the car navigation device 920 may be mounted with a module including a part (for example, the BB processor 934) or the whole of the wireless communication interface 933 and/or the processor 921, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the car navigation device 920, and the wireless communication interface 933 (for example, the BB processor 934) and/or the processor 921 may execute the program. As described above, the car navigation device 920 or the module may be provided or the program for causing the processor to function as the one or more components may be provided, as a device including the one or more components. Furthermore, a readable recording medium on which the program is recorded may be provided.

Furthermore, in the car navigation device 920 illustrated in FIG. 30, for example, the wireless communication unit 220 described with reference to FIG. 3 may be implemented in the wireless communication interface 933 (for example, the RF circuit 935). Furthermore, the antenna unit 210 may be implemented in the antenna 937. Furthermore, the storage unit 230 may be implemented in the memory 922.

Furthermore, the technology according to the present disclosure may also be realized as an in-vehicle system (or a vehicle) 940 including one or more blocks of the car navigation device 920 described above, the in-vehicle network 941, and a vehicle side module 942. The vehicle side module 942 generates vehicle side data such as a vehicle speed, an engine speed, trouble information, or the like, and outputs the generated data to the in-vehicle network 941.

8. End

As described above, in the system according to the embodiment of the present disclosure, a communication device corresponding to a terminal device includes a communication unit that performs wireless communication, an acquisition unit, and a control unit. The acquisition unit acquires first information regarding a control resource set from another device, the control resource set including one or more control resources allocated to a partial area included in a control area and defined for every purpose of resources allocated to a data area. The control unit extracts the control resource set according to the acquired first information, and controls inter-device communication with another communication device via the wireless communication on the basis of the control resource set. Furthermore, a device (for example, a base station) having authority regarding control of inter-terminal communication (for example, sidelink communication) includes a communication unit that performs wireless communication, a notification unit, and a control unit. The notification unit notifies a terminal device of information regarding a control resource set, the control resource set including one or more control resources allocated to a partial area included in a control area and defined for every purpose of resources allocated to a data area. The control unit associates one or more resources allocated to be available for inter-device communication and included in the data area with the control resource set according to purposes of the resources.

With the above configuration, according to the system according to the embodiment of the present disclosure, even in inter-device communication in which a plurality of communication traffics different from each other can be used, such as NR-V2X communication, it becomes possible to efficiently accommodate the plurality of communication traffics (that is, various communication traffics).

Hereinabove, the preferred embodiments of the present disclosure have been described in detail with reference to the accompanying drawings, but a technical scope of the present disclosure is not limited to such examples. It will be apparent to those skilled in the art of the present disclosure that various modifications or alterations can be conceived within the scope of the technical idea described in the claims, and it is naturally understood that these modifications or alterations also fall within the technical scope of the present disclosure.

As a specific example, the technology according to the present disclosure can be applied not only to V2X communication but also to so-called communication between terminal devices such as communication via a sidelink. Specific examples of the communication include device to device (D2D) communication, MTC communication, and the like. Furthermore, as described above, a mode for an FDM type resource pool has been mainly described, but the technology according to the present disclosure can also be applied to a TDM type resource pool. Note that in this case, for example, in parts where a frequency direction and a time direction are described, the frequency direction and the time direction will be appropriately replaced with each other. Furthermore, the technology according to the present disclosure may be applied to sidelink communication in relay communication such as integrated access and backhaul link (IAB). Furthermore, the technology according to the present disclosure may also be applied to a use case of vehicle tethering in which a vehicle is located between a base station and a user terminal around the vehicle to become a relay terminal. In this case, for example, a communication link between the vehicle and the user terminal around the vehicle may be established by a sidelink, and the technology related to the present disclosure may be applied.

Furthermore, the effects described in the present specification are merely illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

A communication device including:

a communication unit that performs wireless communication;

an acquisition unit that acquires information regarding a control resource set from another device, the control resource set including one or more control resources allocated to a partial area included in a control area and defined for every purpose of resources allocated to a data area; and a control unit that extracts the control resource set according to the acquired information regarding the control resource set and controls inter-device communication with another communication device via the wireless communication on the basis of the control resource set.

(2)

The communication device according to the above (1), in which the control resource set is set by a first device having authority regarding the control of the inter-device communication.

(3)

The communication device according to the above (2), in which the device having the authority regarding the control of the inter-device communication is any one of a base station, a road side unit, a relay node, a relay terminal, or a master terminal.

(4)

The communication device according to the above (2) or (3), in which the acquisition unit acquires the information regarding the control resource set from the first device.

(5)

The communication device according to the above (2) or (3), in which the acquisition unit acquires the information regarding the control resource set transmitted from the first device from a second device different from the first device.

(6)

The communication device according to the above (5), in which the acquisition unit acquires the information regarding the control resource set from the second device through the inter-device communication.

(7)

The communication device according to any one of the above (1) to (3), in which the information regarding the control resource set is allocated to a second partial area different from a first partial area to which one or more of the control resource sets are allocated, of the control area, and the acquisition unit extracts the information regarding the control resource set from the second partial area.

(8)

The communication device according to any one of the above (1) to (7), in which the information regarding the control resource set includes information regarding a partial area of the control area to which one or more of the control resource sets are allocated, and the control unit extracts the control resource set on the basis of the information regarding the control resource set.

(9)

The communication device according to any one of the above (1) to (8), in which the control resource set is set for every type regarding the inter-device communication of at least one of a traffic type of the inter-device communication or an allocation method of resources available for the inter-device communication, and the control unit extracts the control resource set according to a type regarding the inter-device communication on the basis of the information regarding the control resource set.

(10)

The communication device according to any one of the above (1) to (9), in which a plurality of control resource sets is associated with at least some resources allocated to be available for the inter-device communication, and the control unit extracts at least some control resource sets of the plurality of control resource sets according to a predetermined condition.

(11)

The communication device according to the above (10), in which the plurality of control resource sets is associated with a resource pool or a sub-resource pool including the at least some resources.

(12)

A communication device including:

a communication unit that performs wireless communication;

a notification unit that notifies a terminal device of information regarding a control resource set, the control resource set including one or more control resources allocated to a partial area included in a control area and defined for every purpose of resources allocated to a data area; and a control unit that associates one or more resources allocated to be available for inter-device communication and included in the data area with the control resource set according to purposes of the resources.

(13)
The communication device according to the above (12), in which the control unit
allocates the control resource set to the partial area included in the control area, and
associates the one or more resources with the control resource set according to the purposes of the resources.

(14)
The communication device according to the above (13), in which the control unit allocates the control resource set to the control area corresponding to a resource pool or a sub-resource pool allocated to be available for the inter-device communication.

(15)
The communication device according to the above (14), in which the control unit individually associates the control resource set with at least some of the resource pools or at least some of the sub-resource pools.

(16)
The communication device according to the above (14) or (15), in which the control unit associates a plurality of resource pools or a plurality of sub-resource pools with at least some the control resource sets.

(17)
The communication device according to any one of the above (12) to (16), in which the control area and the data area are defined by dividing an area to which resources are allocated, in a frequency direction, and
the control unit allocates the control resource set to a partial area generated by dividing the control area in a time direction.

(18)
The communication device according to the above (17), in which the control unit periodically allocates the control resource set every predetermined period.

(19)
The communication device according to the above (18), in which the control unit
sets a control resource set group including a plurality of the control resource sets, and
periodically allocates the control resource set group every predetermined period.

(20)
The communication device according to the above (19), in which the control unit
sets a plurality of the control resource set groups so that the control resource sets different from each other are included in at least some of the plurality of the control resource set groups, and associates each of the plurality of the control resource set groups with a resource pool or a sub-resource pool.

(21)
The communication device according to the above (20), in which the control unit individually associates the resource pool or the sub-resource pool with each of at least some two or more control resource set groups of the plurality of the control resource set groups that are set.

(22)
The communication device according to the above (20) or (21), in which the control unit associates a plurality of resource pools or a plurality of sub-resource pools with at least some control resource set groups of the plurality of control resource set groups that are set.

(23)
The communication device according to any one of the above (20) to (22), in which the control unit associates at least some two or more control resource set groups of the plurality of control resource set groups that are set, with at least some resource pools or at least some sub-resource pools.

(24)
The communication device according to any one of the above (12) to (23), in which the control unit allocates at least some of the control resource sets to a plurality of partial areas generated by allocating the control area on the basis of a predetermined mapping pattern along a time direction.

(25)
A communication method executed by a computer, including:
performing wireless communication;
acquiring information regarding a control resource set from another device, the control resource set including one or more control resources allocated to a partial area included in a control area and defined for every purpose of resources allocated to a data area; and
extracting the control resource set according to the acquired information regarding the control resource set and controls inter-device communication with another communication device via the wireless communication on the basis of the control resource set.

(26)
A communication method executed by a computer, including:
performing wireless communication;
notifying a terminal device of information regarding a control resource set, the control resource set including one or more control resources allocated to a partial area included in a control area and defined for every purpose of resources allocated to a data area; and
associating one or more resources allocated to be available for inter-device communication and included in the data area with the control resource set according to purposes of the resources.

REFERENCE SIGNS LIST

1 System
100 Base station
110 Antenna unit
120 Wireless communication unit
130 Network communication unit
140 Storage unit
150 Control unit
151 Communication control unit
153 Information acquisition unit
155 Notification unit
200 Terminal device
210 Antenna unit
220 Wireless communication unit
230 Storage unit
240 Control unit
241 Communication control unit
243 Information acquisition unit
247 Notification unit

The invention claimed is:
1. A first user equipment configured to perform sidelink communication with a second user equipment, the first user equipment comprising:
a radio transceiver: and
circuitry configured to:

receive from the second user equipment, first control information transmitted in a first resource set used to inform the first user equipment of a second control information transmitted in a second resource set, the first resource set including one or more control resources allocated to a first partial area included in a Physical Sidelink Control Channel (PSCCH), wherein the second control information is transmitted in the second resource set where a cast type is associated the second resource set including one or more control resources allocated to a second partial area which is different from the PSCCH;

decode the second control information transmitted in the second resource set according to the first control information; and control the sidelink communication with the second user equipment, wherein the cast type associated to the second resource set is set from among broadcast, groupcast and unicast.

2. The first user equipment according to claim 1, wherein the first resource set and the second resource set are set by circuitry having authority regarding the control of the sidelink communication.

3. The first user equipment, according to claim 2, wherein the circuitry having the authority regarding the control of the sidelink communication is any one of a base station, a infrastructure terminal, a relay node, a relay terminal, or a master terminal.

4. The first user equipment according to claim 2, wherein the circuitry is configured to acquire the information regarding the first resource set and the second resource set from the second user equipment.

5. The first user equipment according to claim 2, wherein the circuitry is configured to acquire the information regarding the first resource set and the second resource set transmitted from the second user equipment.

6. The first user equipment according to claim 5, wherein the circuitry is configured to acquire the information regarding the first resource set and the second resource set from the second user equipment through the sidelink communication.

7. The first user equipment according to claim 1, wherein the circuitry is configured to extract the information regarding the control resource set from the second partial area.

8. The first user equipment according to claim 1, wherein the information regarding the first and the second resource sets includes information regarding a partial area of the control area to which the first resource set and the second resource set are allocated, and the circuitry is configured to extract the first and the second resource sets on a basis of the information regarding the first and the second resource sets.

9. The first user equipment according to claim 1, wherein the first and the second resource sets are set for every type regarding the sidelink communication of at least one of a traffic type of the sidelink inter device communication or an allocation method of resources available for the sidelink communication, and the circuitry is configured to extract the first and the second resource sets according to a type regarding the sidelink communication on a basis of the information regarding the first and the second resource sets.

10. The first user equipment according to claim 1, wherein a plurality of first and second resource sets are associated with at least some resources allocated to be available for the sidelink communication, and the circuitry is configured to extract at least some first and second resource sets of the plurality of first and second resource sets according to a predetermined condition.

11. The first user equipment according to claim 10, wherein the plurality of first and second resource sets are associated with a resource pool or a sub-resource pool including at least some resources.

12. A communication device comprising:

a communication unit that performs wireless communication;

a notification unit that notifies a terminal device of information regarding a control resource set, the control resource set including one or more control resources allocated to a partial area included in a control area and defined for every purpose of resources allocated to a data area; and a control unit that associates one or more resources allocated to be available for inter-device communication and included in the data area with the control resource set according to purposes of the resources.

13. The communication device according to claim 12, wherein the control unit allocates the control resource set to the partial area included in the control area, and associates the one or more resources with the control resource set according to the purposes of the resources.

14. The communication device according to claim 13, wherein the control unit allocates the control resource set to the control area corresponding to a resource pool or a sub-resource pool allocated to be available for the inter-device communication.

15. The communication device according to claim 14, wherein the control unit individually associates the control resource set with at least some of the resource pools or al least some of the sub-resource pools.

16. The communication device according to claim 14, wherein the control unit associates a plurality of resource pools or a plurality of sub-resource pools with at least some of the control resource sets.

17. The communication device according to claim 12, wherein the control area and the data area are defined by dividing an area to which resources are allocated, in a frequency direction, and the control unit allocates the control resource set to a partial area generated by dividing the control area in a time direction.

18. The communication device according to claim 17, wherein the control unit periodically allocates the control resource set every predetermined period.

19. The communication device according to claim 18, wherein the control unit sets a control resource set group including a plurality of the control resource sets, and periodically allocates the control resource set group every predetermined period.

20. The communication device according to claim 19, wherein the control unit sets a plurality of the control resource set groups so that the control resource sets different from each other are included in at least some of the plurality of the control resource set groups, and associates each of the plurality of the control resource set groups with a resource pool or a sub-resource pool.

21. The communication device according to claim 20, wherein the control unit individually associates the resource pool or the sub-resource pool with each of at least some of two or more control resource set groups of the plurality of the control resource set groups that are set.

22. The communication device according to claim 20, wherein the control unit associates a plurality of resource pools or a plurality of sub-resource pools with at least some control resource set groups of the plurality of control resource se groups that are set.

23. The communication device according to claim 20, wherein the control unit associates at least some two or more control resource set groups of the plurality of control resource set groups that are set, with at least some resource pools or at least some sub-resource pools.

24. The communication device according to claim 12, wherein the control unit allocates at least some of the control resource sets to a plurality of partial areas generated by allocating the control area on a basis of a predetermined mapping pattern along a time direction.

* * * * *